(12) United States Patent
Stanley et al.

(10) Patent No.: US 7,430,212 B2
(45) Date of Patent: Sep. 30, 2008

(54) SYSTEM AND METHOD FOR IMPROVED DATA TRANSMISSION SPEED BY FIXING THE LOWER CORNER FREQUENCY AT A FREQUENCY ABOVE VOICE BAND IN A SYMMETRIC DSL TRANSMISSION SYSTEM

(75) Inventors: Patrick H. Stanley, Suwanee, GA (US); David E. Walford, Alpharetta, GA (US); Clinton F. Earnest, Marietta, GA (US); Robert Keith Fahler, Alpharetta, GA (US); Richard T. Causey, Alpharetta, GA (US)

(73) Assignee: Paradyne Corporation, Largo, FL (US)

( * ) Notice: Subject to any disclaimer, the term of this patent is extended or adjusted under 35 U.S.C. 154(b) by 1121 days.

(21) Appl. No.: 10/073,098

(22) Filed: Feb. 12, 2002

(65) Prior Publication Data

US 2002/0141440 A1 Oct. 3, 2002

Related U.S. Application Data

(60) Provisional application No. 60/268,015, filed on Feb. 13, 2001.

(51) Int. Cl.
*H04L 12/423* (2006.01)

(52) U.S. Cl. .................. 370/420; 370/449; 370/463; 375/222

(58) Field of Classification Search ......... 370/248–252, 370/419–420, 463, 449; 375/220–222
See application file for complete search history.

(56) References Cited

U.S. PATENT DOCUMENTS

| | | | | |
|---|---|---|---|---|
| 4,489,416 A | * | 12/1984 | Stuart | 375/231 |
| 4,817,114 A | * | 3/1989 | Boer et al. | 375/222 |
| 5,999,565 A | * | 12/1999 | Locklear et al. | 375/222 |
| 6,014,371 A | * | 1/2000 | Betts | 370/286 |
| 6,480,533 B1 | * | 11/2002 | Chu et al. | 375/222 |
| 6,611,564 B1 | * | 8/2003 | Linz et al. | 375/295 |
| 6,904,082 B2 | * | 6/2005 | Jones | 375/220 |
| 6,967,996 B1 | * | 11/2005 | Cai et al. | 375/222 |

\* cited by examiner

*Primary Examiner*—Gregory B Sefcheck
*Assistant Examiner*—Duc T Duong
(74) *Attorney, Agent, or Firm*—Thomas, Kayden, Horstemeyer & Risley, LLP

(57) ABSTRACT

A system and method of the present invention improves data transmission speeds by fixing the lower corner frequency at a frequency above voice band in a symmetric DSL transmission system. By using a fixed lower corner frequency that is above the voiceband and increasing the upper corner frequency upward as the symbol rate increases, the communication equipment systems utilize symmetric frequency plans that incorporate the relatively low loss, low crosstalk spectrum range while still being able to operate on the same line as analog voice band. Another aspect of the present invention is directed to multiplexing a first modem for communicating information packets between the first modem and a plurality of second modems via a single two-wire (e.g. telephone subscriber) lines. The present invention provides a Multi-Access (MA) protocol that enables a single link to be utilized by more than one access device (e.g., a CPE Modem). The Multi-Access protocol of the present invention provides a means to connect to multiple endpoints on a single local loop. Each CPE Modem may communicate directly with a modem at a CO location thereby removing the need for expensive gateway devices and secondary in-building cabling to support multiple access points.

60 Claims, 25 Drawing Sheets

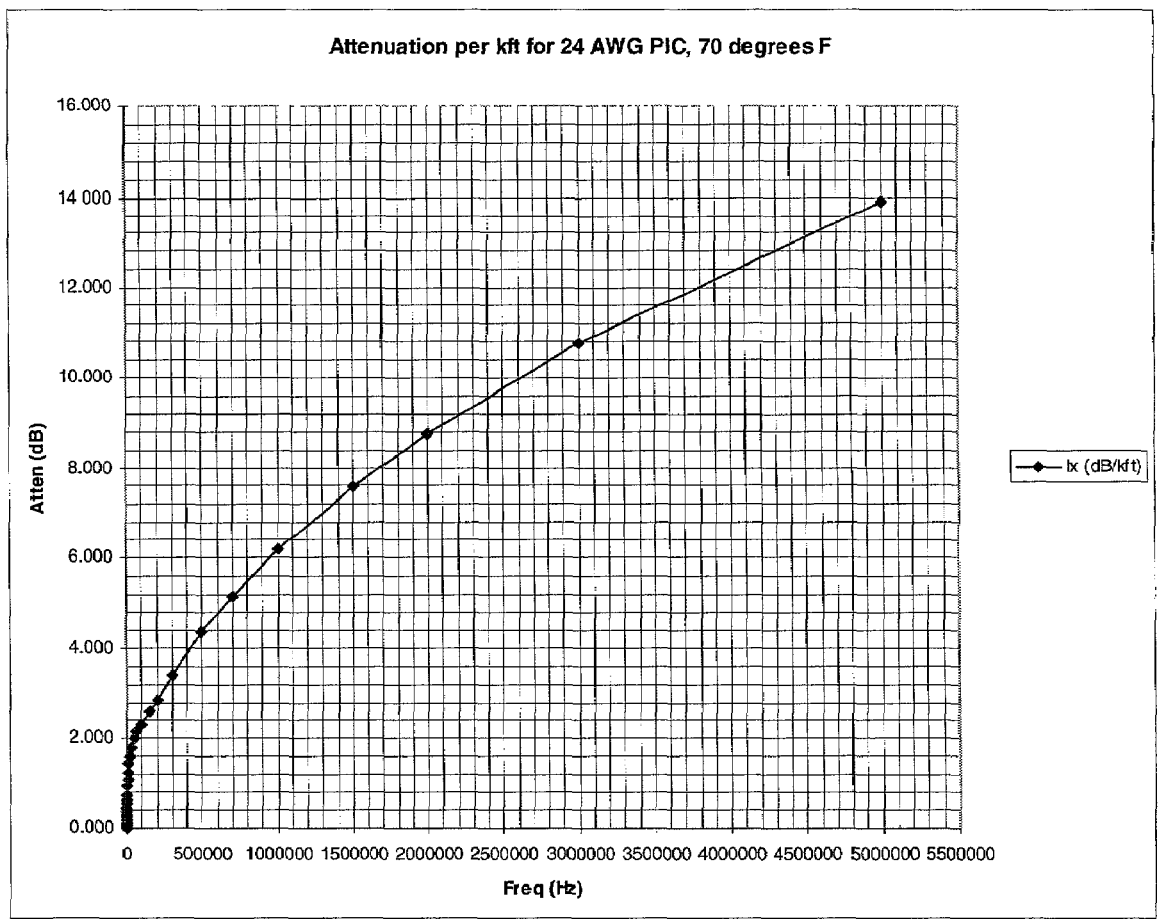
Figure 2: Loop Loss per kft, as a function of frequency

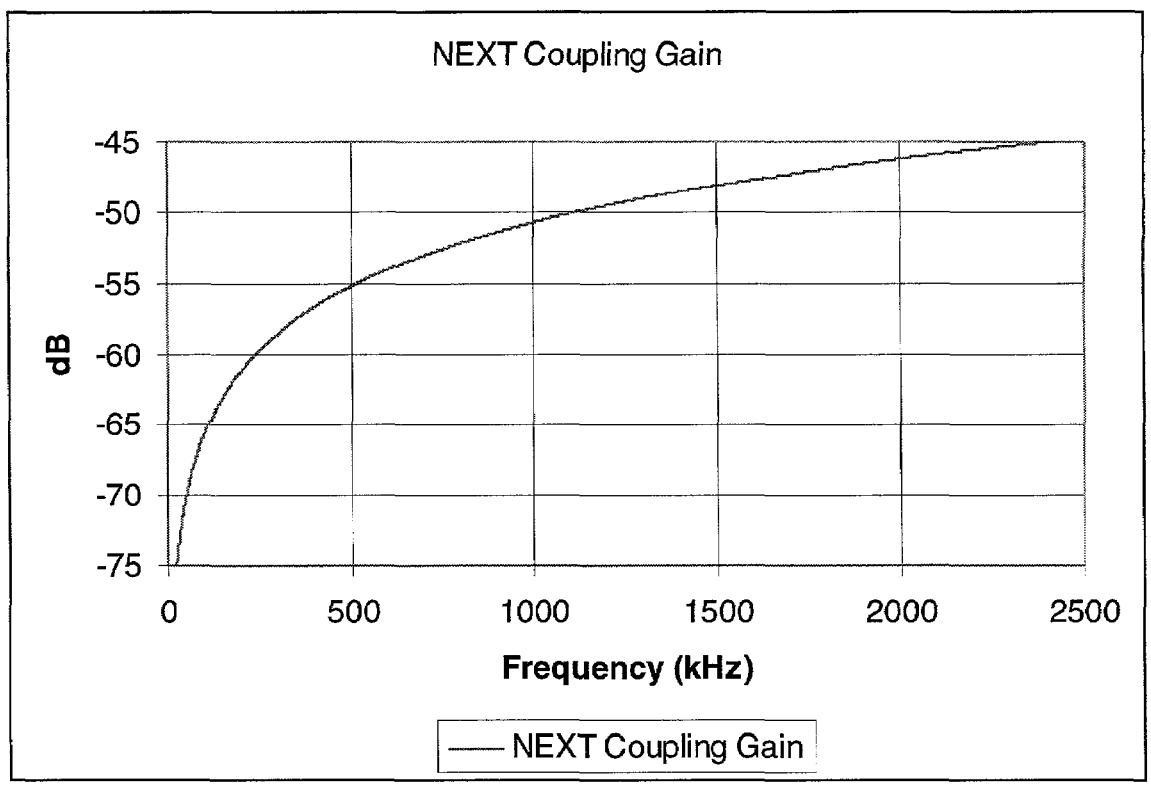
Figure 3 Near End Crosstalk (NEXT) Coupling Gain

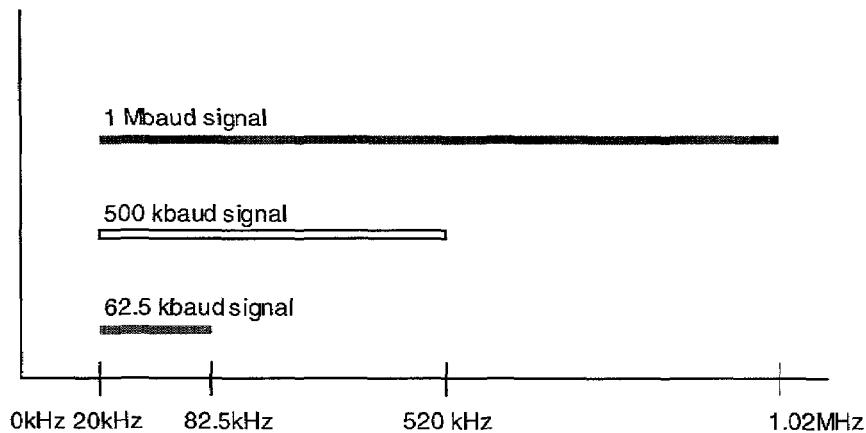
Figure 4 – Example Bandplans with 20kHz lower corner frequency
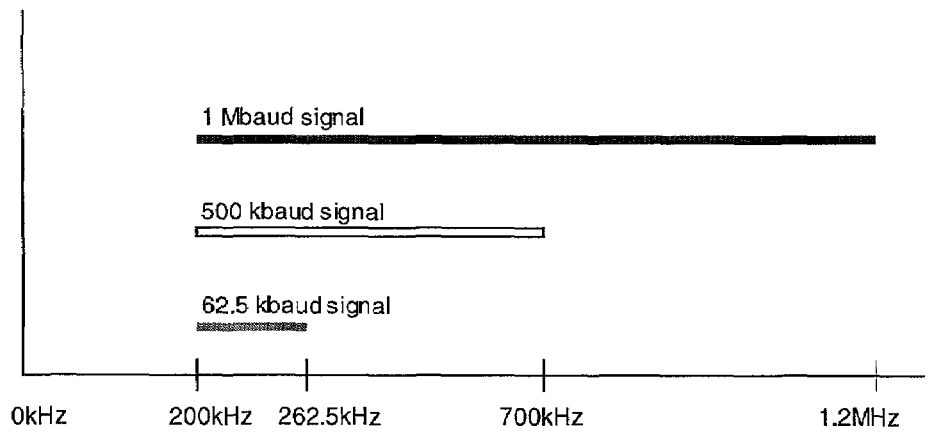
Figure 5 – Example Band Plans with 200kHz lower corner frequency

| D7$_k$ | D6$_k$ | I$_{k-1}$ | Q$_{k-1}$ | I$_k$ | Q$_k$ |
|---|---|---|---|---|---|
| 0 | 0 | 0 | 0 | 0 | 0 |
| 0 | 0 | 0 | 1 | 0 | 1 |
| 0 | 0 | 1 | 0 | 1 | 0 |
| 0 | 0 | 1 | 1 | 1 | 1 |
| 0 | 1 | 0 | 0 | 1 | 0 |
| 0 | 1 | 0 | 1 | 0 | 0 |
| 0 | 1 | 1 | 0 | 1 | 1 |
| 0 | 1 | 1 | 1 | 0 | 1 |
| 1 | 0 | 0 | 0 | 0 | 1 |
| 1 | 0 | 0 | 1 | 1 | 1 |
| 1 | 0 | 1 | 0 | 0 | 0 |
| 1 | 0 | 1 | 1 | 1 | 0 |
| 1 | 1 | 0 | 0 | 1 | 1 |
| 1 | 1 | 0 | 1 | 1 | 0 |
| 1 | 1 | 1 | 0 | 0 | 1 |
| 1 | 1 | 1 | 1 | 0 | 0 |

# SYSTEM AND METHOD FOR IMPROVED DATA TRANSMISSION SPEED BY FIXING THE LOWER CORNER FREQUENCY AT A FREQUENCY ABOVE VOICE BAND IN A SYMMETRIC DSL TRANSMISSION SYSTEM

CROSS REFERENCE TO RELATED APPLICATION

This patent application claims priority to U.S. provisional patent application Ser. No. 60/268,015, filed Feb. 13, 2001, which is hereby incorporated by reference in its entirety.

FIELD OF THE INVENTION

The present invention relates to information network access, and is particularly concerned with apparatus and methods for communicating information packets, generally referred to as Ethernet frames, via two-wire lines such as telephone subscriber lines using a fixed lower corner frequency at a frequency above the voice band. The present invention further relates to an apparatus and methods for multiplexing a first modem for communicating information packets between the first modem and a plurality of second modems via two-wire lines.

BACKGROUND OF THE INVENTION

Current Digital Subscriber Line (DSL) systems either use Frequency Division Duplexing (FDD), or Echo Cancelled (EC) frequency plans. In the FDD frequency plans, the upstream (from customer premises equipment (CPE) to Central Office (CO) or Remote Terminal (RT)) and downstream signals (from CO or RT to CPE) reside in different portions of the spectrum. Furthermore, in these FDD systems, the lowest portion of the frequency spectrum, where voiceband signals are present, are not used by the DSL modems. This allows the FDD DSL modems to share the line with the voiceband analog voice equipment. The baseband (e.g., systems commonly called SDSL (Symmetric DSL), HDSL2 (High-Speed DSL 2), ISDN (Integrated Services Digital Network), etc.) EC systems use the same frequency bands for both upstream and downstream signals, employing echo cancellers to remove the locally transmitted signal from the received signal. These baseband DSL modems include the lowest frequency portion of the spectrum in their signals, which means that they cannot share a line with voiceband analog voice equipment. One version of the system commonly called Asymmetric Digital Subscriber Line (ADSL) also employs EC, but uses different frequency bands for upstream and downstream traffic. While the downstream band totally overlaps the upstream band, the bands are unequal, with the downstream band extending to greater frequencies than the upstream band. FIG. 1 illustrates some of these band plans.

FIG. 2 shows the loop loss, measured in dB/kft, of 24 AWG twisted pair telephone wire, as a function of frequency. FIG. 3 shows the 99th percentile worst case near end (NEXT) crosstalk coupling gain, as a function of frequency. As shown in FIGS. 2 and 3, the loop loss increases and the amount of crosstalk coupling increases as a function of frequency. This means that successful communication becomes more difficult as the frequency of the signal increases.

Optical Ethernet provides a universal medium for all applications, with the flexibility and bandwidth to support future application demands as well. But unlike the copper infrastructure, which is deployed to every home and building, the existing fiber infrastructure is limited in the number of locations directly connected to the fiber. Trenching fiber to new locations not only impacts the capital costs, but also severely limits the velocity of deployment. As a result, the Optical Ethernet opportunity is limited. While a service provider may deploy a Metro Area Network (MAN) using Optical Ethernet, most customers, with their Ethernet LANs at the ready, are left waiting.

The existing copper infrastructure, with its universal penetration, offers an opportunity to close the chasm between the MAN and the LAN. Conventional xDSL technologies, however, suffer from their own problems. Most important, they are based on ATM, making them a strange partner in an end-to-end Ethernet network. In addition, their deployment velocity is limited by the requirement that service providers condition their copper loops to bring them up to a quality that can support the technology. Conventional xDSL technologies also suffer from spectral compatibility issues, impacting reliability and complicating deployment, as service providers manage their binders to ensure that incompatible technologies are kept away from each other. Also, these technologies are fixed in symmetry, forcing the service provider to mix and match technologies to applications, and deal with the inevitable complexity. Finally, these technologies are limited in reach, typically to 18,000 feet but often derated to 15,000 feet in order to avoid problems.

Ethernet over VDSL (EoVDSL) uses the VDSL band plan to transmit Ethernet frames. As an Ethernet-based technology, it fits within an end-to-end Ethernet strategy. But EoVDSL is limited in reach to 4,500 feet, making it suited more for in-building applications. As a variant of VDSL, EoVDSL suffers from many of the same issues as conventional xDSL, such as spectral compatibility concerns, low deployment velocity, and fixed bandwidth symmetry.

SUMMARY OF THE INVENTION

Various embodiments of the present invention use the same (or substantially similar) frequency band upstream and downstream, with varying symbol rates and a fixed lower corner frequency. The present invention takes advantage of the lower crosstalk and lower loss of the lower frequencies, while allowing the communication equipment to operate on the same line as voiceband analog phone equipment. By using a fixed lower corner frequency that is above the voiceband and increasing the upper corner frequency upward as the symbol rate increases, the communication equipment systems utilize symmetric frequency plans that incorporate the relatively low loss, low crosstalk spectrum range while still being able to operate on the same line as analog voice band.

Through the present invention, a system is provided that delivers fiber-class applications over existing copper. Optical Ethernet service providers may use the existing copper infrastructure to expand market opportunities. The present invention provides service providers and other users with a copper bridge to the Optical Ethernet.

Another aspect of the present invention is directed to multiplexing a first modem for communicating information packets between the first modem and a plurality of second modems via a single two-wire (e.g. telephone subscriber) lines. Another aspect of the present invention is directed to buffering information packets received from a network via an interface into at least one buffer per secondary modem. This aspect of the present invention further involves monitoring the fill of these buffers and varying the ratio of packets communicated from each buffer as a function of the monitored fills. Another aspect of the present invention is directed to enabling control information to be communicated from the first modem to each secondary modem to inform the secondary modems of when to transmit, in order to avoid collisions with other secondary modems. This control information, and information packets may be communicated individually to each secondary modem via an addressing scheme, or broadcast to a plurality or all secondary modems simultaneously, with each secondary modem responding only to packets addressed to themselves.

The present invention provides a Multi-Access (MA) protocol that enables a single link to be utilized by more than one access device (e.g., a CPE Modem). The Multi-Access protocol of the present invention provides a means to connect to multiple endpoints on a single local loop. The MA protocol of the present invention leverages a burst mode operation to enable new services, such as multiple IP Streaming devices, to attach directly to a single loop. Each CPE Modem may communicate directly with a modem at a CO location thereby removing the need for expensive gateway devices and secondary in-building cabling to support multiple access points.

According to an embodiment of the present invention, a method for communicating information packets between at least a first modem and a second modem via a communication line, comprises the steps of setting a fixed lower corner frequency to enable communications to occur on a portion of a communication spectrum not used by another coexisting application to enable line sharing functionality; determining a center frequency based on the fixed lower corner frequency and a baud rate; and operating a signal in a lower end of the communication spectrum wherein signal loss and crosstalk are reduced; wherein the coexisting application includes at least one of analog voice band; integrated services digital network, Centrex, and digital private branch exchange.

Other features of this embodiment of the present invention may include the steps of detecting a symbol rate change and adjusting a frequency band for communication in response to the symbol rate change; wherein the baud rate ranges from approximately 62.5 kHz to 13.333 Mhz; the step of implementing a QAM 256 modulation scheme for increasing data rate; the step of implementing a decision feedback equalizer for improved filtering; the step of providing forward error correction for recovering corrupted data; the step of delivering approximately 100 Mbps at a distance up to 2750 feet; the step of delivering approximately 20 Mbps at a distance up to 7500 feet; the step of delivering approximately 2.9 Mbps at a distance up to 21,000 feet; and wherein the center frequency is determined by $$f_c = \frac{\text{baud rate} + \text{excess bandwidth}}{2} + \text{fixed lower corner frequency.}$$

According to another embodiment of the present invention, a system for communicating information packets between at least a first modem and a second modem via a communication line, the system comprising a fixed corner frequency means for setting a fixed lower corner frequency to enable communications to occur on a portion of a communication spectrum not used by another coexisting application to enable line sharing functionality; a center frequency means for determining a center frequency based on the fixed lower corner frequency and a baud rate; and an operating means for operating a signal in a lower end of the communication spectrum wherein signal loss and crosstalk are reduced; wherein the coexisting application includes at least one of analog voice band; integrated services digital network, Centrex, and digital private branch exchange.

Other features of this embodiment of the present invention may include a detecting means for detecting a symbol rate change and an adjusting means for adjusting a frequency band for communication in response to the symbol rate change; wherein the baud rate ranges from approximately 62.5 kHz to 13.333 Mhz; a QAM 256 modulation scheme for increasing data rate; a decision feedback equalizer for improved filtering; a forward error corrector for recovering corrupted data; wherein the system delivers approximately 100 Mbps at a distance up to 2750 feet; wherein the system delivers approximately 20 Mbps at a distance up to 7500 feet; wherein the system delivers approximately 2.9 Mbps at a distance up to 21,000 feet; and wherein the center frequency is determined by $$f_c = \frac{\text{baud rate} + \text{excess bandwidth}}{2} + \text{fixed lower corner frequency.}$$

According to another embodiment of the present invention, a transmitter for communicating information packets via a communication line, comprises an encoder for encoding a digital data stream into a waveform; and a transmitting means for transmitting the waveform comprising information packets via a two-wire line, wherein the two-wire line is a telephone subscriber line; wherein the transmitter operates at a fixed lower corner frequency to enable communications to occur on a portion of a communication spectrum not used by another coexisting application to enable line sharing functionality wherein signal loss and crosstalk are reduced; and wherein the coexisting application includes at least one of analog voice band; integrated services digital network, Centrex, and digital private branch exchange.

Other features of this embodiment of the present invention may include a scrambler for scrambling a plurality of input bits to whiten the spectrum of the signal being transmitted; wherein a tap polynomial of the scrambler is represented by $x(n)=m(n)+x(n-18)+x(n-23)$; a FEC encoder for adding coding gain by adding a plurality of bits for error correction; a QAM data encoder for performing a differential phase encoding; a Thomlinson pre-coder for pre-emphasizing the signal to counteract the communication line; at least one pulse-shaping filter comprising a low-pass finite impulse response filter with a square-root raised cosine response to interpolate a waveform to a predetermined number of samples per symbol; at least one cascaded integrator comb interpolator for interpolating a frequency signal by a predetermined amount; an agile mixer for receiving a base-band in-phase signal and quadrature-phase signal and complex mixing the signals to transmit at a variable carrier frequency.

According to another embodiment of the present invention, a receiver for receiving information packets via a communication line comprises a decoding means for decoding a sampled analog signal into a series of symbols; and a receiving means for receiving the sampled analog signal via a two-wire line, wherein the two-wire line is a telephone subscriber line; wherein the receiver operates at a fixed lower corner frequency to enable communications to occur on a portion of a communication spectrum not used by another coexisting application to enable line sharing functionality wherein signal loss and crosstalk are reduced; and wherein the coexisting application includes at least one of analog voice band; integrated services digital network, Centrex, and digital private branch exchange.

Other features of this embodiment of the present invention may include an agile mixer for receiving a pass-band signal and complex mixing the pass-band signal to an in-phase base-band and a quadrature-phase base-band using a variable carrier frequency; at least one cascaded integrator comb decimator for decimating an input signal by a predetermined amount; wherein the receiver comprises at least one pulse-shaping filter comprising a low-pass finite impulse response filter with a square-root raised cosine response to interpolate a waveform to a predetermined number of samples per symbol; and a descrambler for recovering original data, wherein a tap polynomial of the descrambler is represented by $x(n)=m(n)+m(n-18)+m(n-23)$.

According to another embodiment of the present invention, a method for communicating information packets between a first CO modem and a plurality of CPE modems, comprises the steps of observing a training process for the plurality of CPE modems; assigning a CPE selector identifier to each CPE modem based on the training process; and responding to a burst directed to a CPE selector identifier.

Other features of this embodiment of the present invention may include each CPE modem of the plurality of CPE modems communicating via a single loop; each CPE modem of the plurality of CPE modems communicating via individual connecting loops; the steps of buffering the information packets received from a network into at least one buffer per CPE modem, monitoring the step of buffering the information packets, and varying a ratio of packets communicated from each buffer associated with the plurality of CPE modems as a function of the step of monitoring; the step of communicating control information from the first CO modem to each plurality of CPE modems, wherein the control information comprises transmission data to avoid collisions with other CPE modems; wherein the control information is communicated via an addressing scheme; and wherein the control information is communicated via a broadcast scheme to the plurality of CPE modems, wherein each CPE modem responds individually.

According to another embodiment of the present invention, a method for communication information packets from a CO modem, comprises the steps of observing a training process for a plurality of CPE modems; assigning a CPE selector identifier to each CPE modem; generating a polling sequence addressed to each CPE modem; and forwarding information packets in a burst to the plurality of CPE modems, via the CPE selector identifier for each CPE modem.

Other features of this embodiment of the present invention may include the step of maintaining a table of trained speeds for the plurality of CPE modems for selecting a speed for forwarding the burst addressed to a CPE modem; wherein the CPE selector identifiers are incorporated into a bridge table to create a logical mapping of MAC addresses to each CPE modem; the step of implementing a plurality of CPE selector interfaces to forward the information packets in the burst to each CPE modem; wherein the polling sequences are adaptive polling sequences for minimizing polling directed to one or more inactive CPE modems According to another embodiment of the present invention, a method for receiving information packets by a plurality of CPE modems, comprises the steps of training the plurality of CPE modems; learning a CPE selector identifier for each CPE modem; responding to a burst directed to a CPE selector identifier, associated with a CPE modem within the plurality of CPE modems; and generating a reply burst to each polling sequence addressed to the CPE selector identifier.

Other features of this embodiment of the present invention may include each CPE modem of the plurality of CPE modems communicating via a single loop; each CPE modem of the plurality of CPE modems communicating via individual connecting loops; wherein the plurality of CPE modems train to a substantially similar set of speeds; wherein the plurality of CPE modems respond to a substantially similar set of speeds; the step of observing a frame header on the information packet to determine processing data; the step of receiving a broadcast message for enabling the plurality of CPE modems to process the broadcast message from a single packet in the burst; wherein the burst comprises control parameters; and wherein the control parameters comprise sequencing data associated with generating reply data.

According to another embodiment of the present invention, a system for communicating information packets between a first CO modem and a plurality of CPE modems, comprises an observing means for observing a training process for the plurality of CPE modems; an assigning means for assigning a CPE selector identifier to each CPE modem based on the training process; and a responding means for responding to a burst directed to a CPE selector identifier.

Other features of this embodiment of the present invention may include each CPE modem of the plurality of CPE modems communicating via a single loop; each CPE modem of the plurality of CPE modems communicating via individual connecting loops; a buffering means for buffering the information packets received from a network into at least one buffer per CPE modem, a monitoring means for monitoring the step of buffering the information packets, and a varying means for varying a ratio of packets communicated from each buffer associated with the plurality of CPE modems as a function of the step of monitoring; a communicating means for communicating control information from the first CO modem to each plurality of CPE modems, wherein the control information comprises transmission data to avoid collisions with other CPE modems; wherein the control information is communicated via an addressing scheme; and wherein the control information is communicated via a broadcast scheme to the plurality of CPE modems, wherein each CPE modem responds individually.

The accompanying drawings, which are incorporated in and constitute a part of this specification, illustrate various embodiments of the invention and, together with the description, serve to explain the principles of the invention.

BRIEF DESCRIPTION OF THE DRAWINGS

The present invention can be understood more completely by reading the following Detailed Description of the Invention, in conjunction with the accompanying drawings, in which:

FIG. 2 illustrates loop loss, measured in dB/kft, of 24 AWG twisted pair telephone wire, as a function of frequency.

FIG. 3 shows the 99th percentile worst case near end (NEXT) crosstalk coupling gain, as a function of frequency.

FIG. 4 illustrates example band plans that uses a 20 kHz fixed lower corner frequency, according to an embodiment of the present invention.

FIG. 5 illustrates example band plans that use a 200 kHz fixed lower corner frequency, according to an embodiment of the present invention.

DETAILED DESCRIPTION OF THE INVENTION

Figure 1:
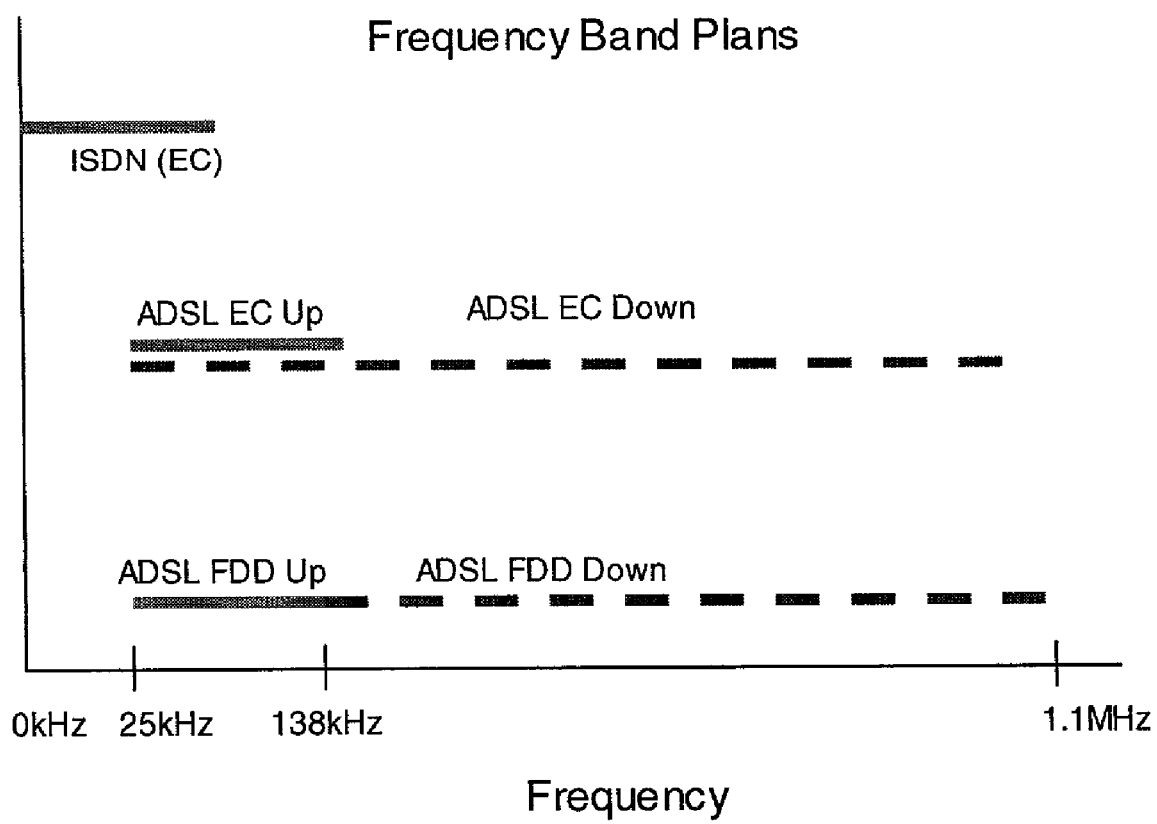
FIG. 1 illustrates frequency band plans for FDD frequency plans and EC systems.

The following description is intended to convey a thorough understanding of the invention by providing a number of specific embodiments and details involving improved data transmission speed in a symmetric DSL transmission system. It is understood, however, that the invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

While the lower corner frequency may be set at different levels, according to one embodiment of the present invention, it may be desirable to set the lower corner frequency above the voice band and any voice communication channel employed on the line. For example, in one embodiment of the present invention, a lower corner frequency of around 20 kHz is implemented, allowing the communications equipment to share the line with Centrex (central office exchange service) phone systems that employ signaling in frequencies greater than a 4 kHz voiceband, but less than 20 kHz. In another embodiment of the present invention, a lower corner frequency of around 200 kHz is implemented to allow the communications equipment to share the line with ISDN equipment. In these embodiments, the system of the present invention may include a frequency diplexer that separates transmissions from the phone equipment that uses frequencies below the fixed lower corner frequency. For other communication systems, a different lower corner frequency may be selected to allow those communications to occur on a portion of the communication spectrum used by that system.

Communications using the system of the present invention may incorporate a number of different levels of modulation, including at least QAM (Quadrature Amplitude Modulation) modulation, including, but not limited to, QAM2, QAM4, QAM16, QAM64, and QAM256. Other modulation techniques may also be used, such as VSB (Vestigial Side Band), CAP (Carrier-less Amplitude and Phase), DMT (Discrete Multi-Tone), and OFDM (Orthogonal Frequency Division Multiplexing), with a wide range of bits per tone.

One embodiment of the present invention involves applications to a half-duplex system, commonly called EtherLoop™, described in U.S. Pat. No. 5,912,895, which is hereby incorporated by reference in its entirety. When used with the system commonly called EtherLoop™, the frequency band available changes with the symbol rate, as described in the '895 Patent. When the symbol rate changes, the system of the present invention adjusts the frequency band for communications accordingly, with the lower corner frequency remaining fixed. For example, in the EtherLoop™ system, the symbol rate may change from 62.5 kbaud to 1 Mbaud to 1.66 Mbaud. If the lower corner frequency is fixed at 20 kHz, a 62.5 kbaud signal would occupy the frequency band from 20 kHz to 82.5 kHz, while a 1 Mbaud signal would occupy the frequency band from 20 kHz to 1.02MHz, and 13.33 Mbaud signal would occupy the frequency band from 20 kHz to 13.35MHz, and so forth. Another embodiment of the present invention involves applications to a full duplex system that use the same (or substantially similar) frequency plan for both upstream and downstream signals.

FIG. 4 shows example band plans for an embodiment that uses a 20 kHz fixed lower corner frequency. FIG. 5 shows example band plans that use a 200 kHz fixed lower corner frequency. Other fixed lower corner frequencies may be implemented in accordance with the present invention. These frequency band plans are also applicable to full duplex and/or other systems.

Various embodiments of the present invention build on the principles of Etherloop™ with several signaling techniques, which include a fixed corner frequency, increased number of center frequencies, addition of QAM 256, improved filtering and forward error correction.

Current technologies use a fixed relationship between a baud rate and a center frequency. Baud rate generally represents a unit of measure of transmission speed. For example, baud rate is a measure of the number of signal-state changes per second. In particular, the center frequency is equal to the baud rate in current systems. In contrast, the present invention uses a signaling method based on a fixed corner frequency. This allows the signal to operate in the lower end of the spectrum, which results in reductions in signal loss and crosstalk thereby resulting in a higher signal quality.

Figure 6:
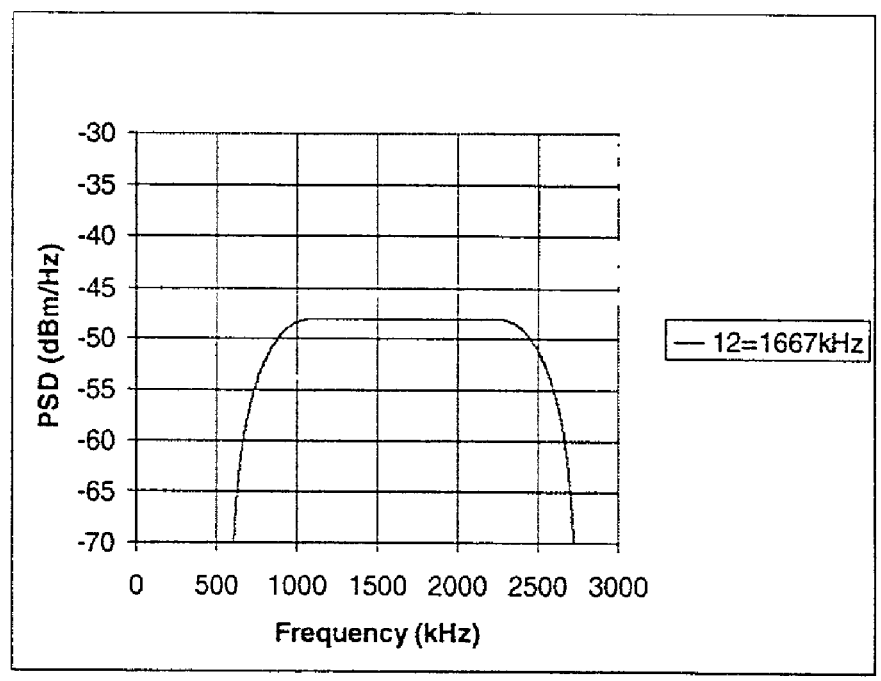
FIG. 6 illustrates power spectrum density for a current system.
Figure 7:
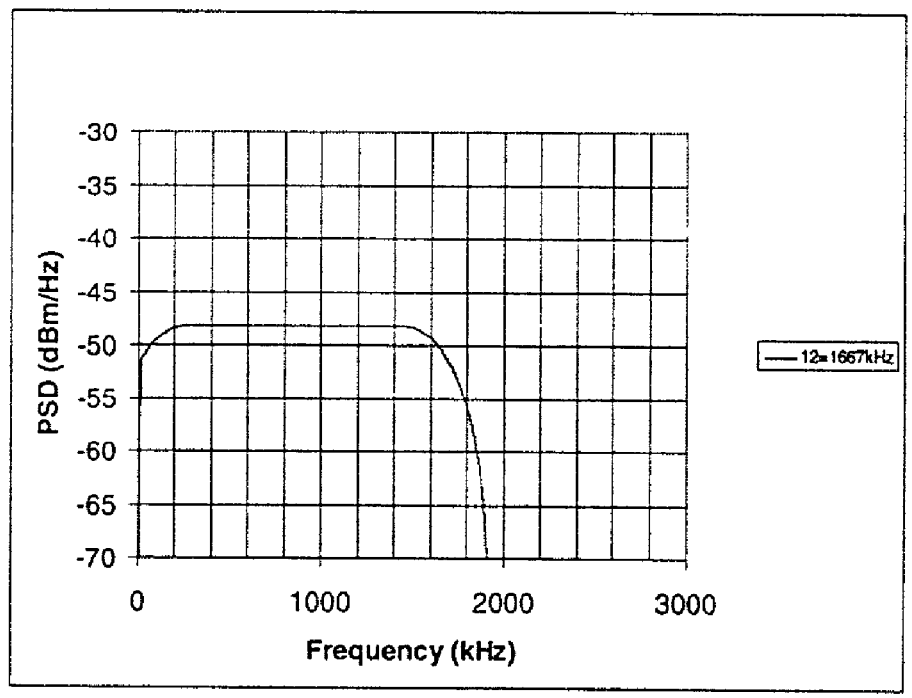
FIG. 7 illustrates power spectrum density, according to an embodiment of the present invention.

FIG. 6 illustrates Power Spectrum Density (PSD)—the amount of power transmitted by current systems—at a 1.667 MHz frequency. FIG. 6 shows that the center frequency equals the baud rate, according to current technology. In this example, the 1.667 MHz signal has a 1.667M symbol rate. By using a fixed lower corner frequency, the present invention is able to deliver the same symbol rate with a lower average frequency, as shown in FIG. 7.

According to one example, the present invention may use a 1.667 Mbaud symbol rate where the signal is no longer centered on the same frequency. Rather, the PSD may be anchored at a particular frequency, such as 20 kHz, to provide enough bandwidth on the low end to coexist with analog POTS on the same loop. Other anchoring frequencies may also be implemented, depending on the system and other considerations. According to an embodiment of the present invention, the center frequency for a signal may be calculated by the following equation:

$$f_c = \frac{\text{baud rate} + \text{excess bandwidth}}{2} + \text{fixed lower corner frequency}$$

By applying the above equation, the center frequency for the signal may be calculated as follows:

$$f_c = \frac{1.667 \text{ M} + 0.1667 \text{ M}}{2} + 20 \text{ kHz} = 853.3 \text{ kHz}.$$

Therefore, in this particular example, the signal is able to deliver 1.667M symbols per second using a center frequency of 936.7 kHz, which is approximately half the center frequency used to deliver the same symbol rate with current technologies.

Figure 8:
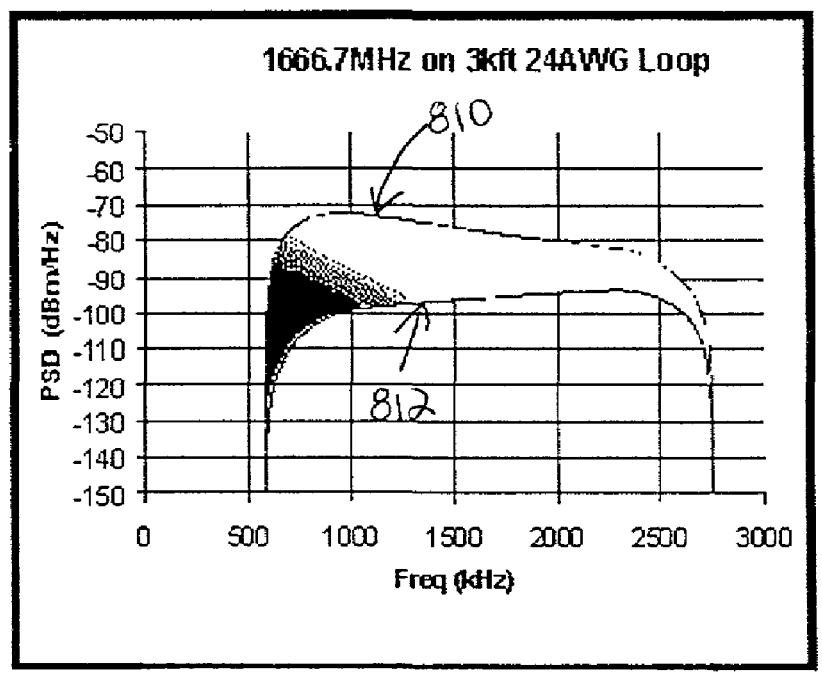
FIG. 8 illustrates SNR for a current system.

By using lower frequencies to deliver the same symbol rate, the present invention reduces the effects of loop loss and crosstalk, among other adverse factors. The impact may be seen by measuring the Signal-to-Noise Ratio (SNR) for the same symbol rate for current systems and the present invention. FIG. 8 displays the SNR for a 1.667M symbols/sec signal for a current system. The top curve 810 indicates the received signal and the bottom curve 812 indicates the crosstalk (or noise) on the line of the current system. The shaded area indicates the difference between the signal and the noise. For this signal, the average SNR is 24 dB.

Figure 9:
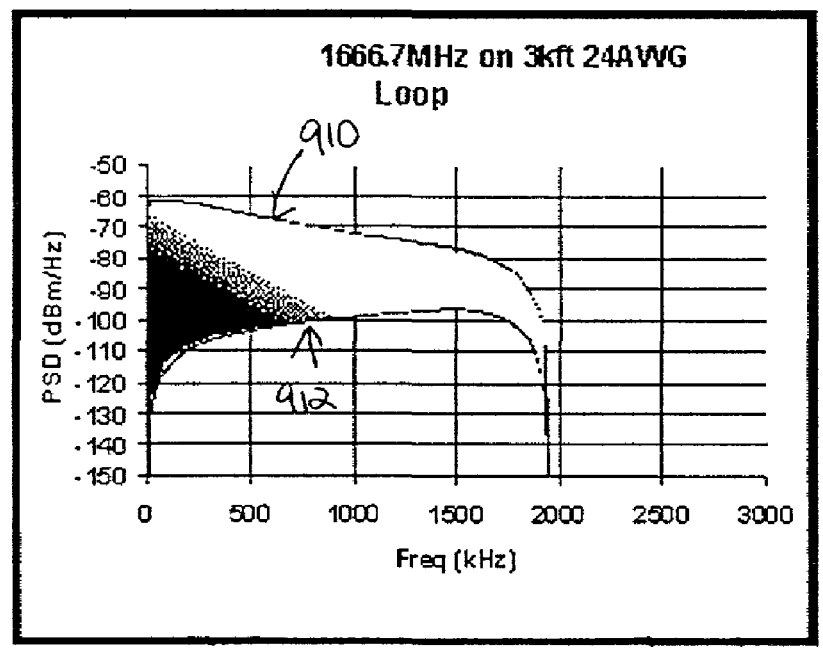
FIG. 9 illustrates SNR, according to an embodiment of the present invention.

For the present invention, a 1.667M symbols/sec signal shows a significant improvement in SNR, as shown in FIG. 9. The top curve 910 indicates the received-signal and the bottom curve 912 indicates the crosstalk (or noise) on the line of a system of the present invention. Using a fixed lower corner frequency of the present invention, the average SNR has improved from 24 db to 35 db. This higher signal fidelity translates into the ability to deliver higher data rates at the same distance.

Figure 10:
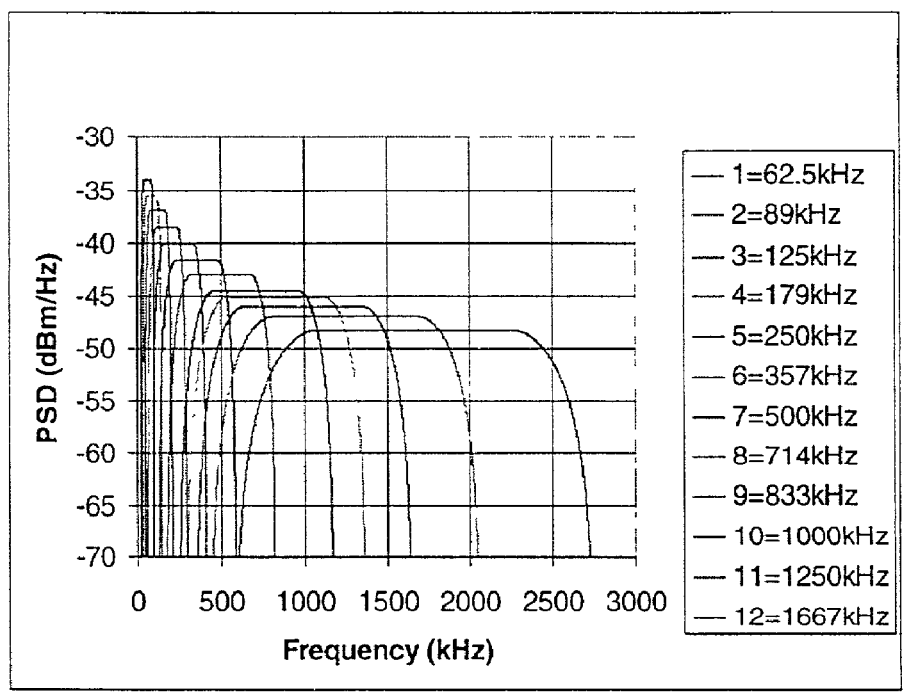
FIG. 10 illustrates 12 baud rates for a current system.
Figure 11:
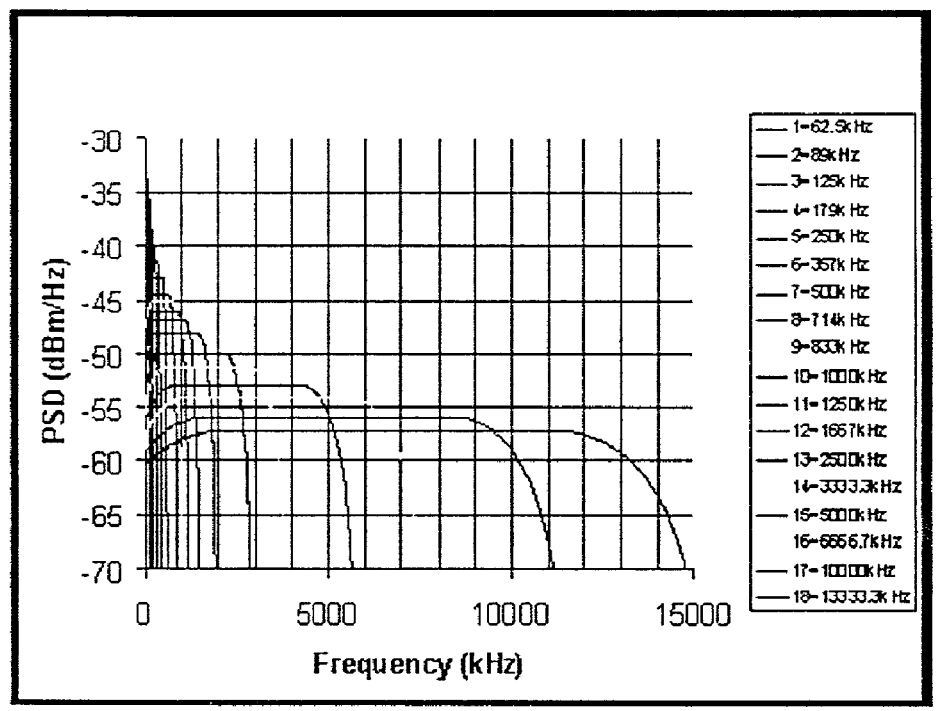
FIG. 11 illustrates 18 frequency options, according to an embodiment of the present invention.

Another feature of the present invention involves an increased number of center frequencies. While current systems may operate with at most 12 possible baud rates from 62.5 kHz to 1.667 MHz, the present invention provides at least six additional frequencies, for a total of 18 or more center frequencies. These baud rates may range from 62.5 kHz to 13.333 MHz, for example. This expanded range provides a straightforward mechanism for increasing the data rate. A current system's (e.g., Etherloop™ as described in U.S. Pat. No. 5,912,895) 12 baud rates are displayed in FIG. 10. The present invention provides at least six new baud rates to provide at least 18 frequency options, all with the aforementioned fixed lower corner frequency, as shown in FIG. 11. The additional baud rates may include 2500 kHz, 3333.3 kHz, 5000 kHz, 6666.7 kHz, 10000 kHz and 13333.3 kHz.

Yet another feature of the present invention includes the addition of QAM 256. The present invention adds the QAM 256 modulation scheme to currently available QPSK, QAM 16, and QAM 64 modulation schemes, providing another straightforward mechanism for increasing the data rate. QAM 256 enables transmission of 8 bits per symbol.

Another feature of the present invention involves improved filtering. Current systems generally rely on a Linear Equalizer to improve signal quality. The present invention improves current technology with a Decision Feedback Equalizer that provides a higher quality signal.

Another feature of the present invention involves forward error correction (FEC). Generally, current systems do not provide any error correction techniques. The present invention provides FEC, which adds "coding gain." Through FEC functionality, data that is corrupted during transmission may be recovered. This coding technique has effectively the same result as increasing the gain of the signal, hence the term "coding gain". By adding FEC, the system of the present invention is therefore more robust.

The present invention delivers significant advancements in the rate versus reach relationship as well as significant improvements in performance. Delivering 100 Mbps at distances up to 2750 feet, the present invention extends 100 Mbps Ethernet networks by a factor of 10, as compared to the 300-foot limit for 100 BaseT Ethernet. The present invention provides the ability to deploy broadband speeds at extended distances. For example, the present invention provides 20 Mbps at 7500 feet, 10 Mbps at 11,000 feet, and 2.9 Mbps at 21,000 feet.

The present invention provides a strong complement to an Optical Ethernet network. Based on Ethernet, the present invention natively fits within the end-to-end Ethernet strategy. The technology of the present invention is deployable in both in-building and outside plant applications, and has flexible bandwidth symmetry. Because the technology is spectrally compatible and does not require conditioning of the copper, the present invention provides high velocity of deployment. The present invention provides the ability to deliver 100 Mbps as well as broadband speeds at all distances up to 21,000 feet.

The technology of the present invention enhances the economics for Optical Ethernet deployments. The ability to provide high bandwidth Ethernet over existing copper infrastructure offers service providers (and/or other users) the ability to expand their Optical Ethernet business, by instantly expanding their addressable market. As the copper bridge, the present invention enables service providers the ability to deliver Ethernet services to customers who may be within reach of fiber technology, by using existing copper. Without a copper bridge, a service provider (or other user) is left with a single avenue for reaching customers, and must measure each opportunity against the capital cost and time to market of trenching fiber. With a copper bridge provided by the present invention, the same service providers now have an economic choice. The present invention further allows a service provider to first establish services over copper and to grow with the customer until a fiber solution is justified.

While one embodiment of the present invention provides a maximum bandwidth of at least 100 Mbps over ordinary telephone wire, according to one example, it also provides a significant improvement at other distances. For example, 20 Mbps is more than sufficient bandwidth for current broadband applications. With 20 Mbps to the end user, a service provider may deliver digital television services, including video on demand, to multiple televisions, while also delivering additional telephone lines using voice over IP and providing high speed Internet. The present invention provides an opportunity for service providers to capture the revenue from a consumer's voice, video, and data services. The system of the present invention may deliver 20 Mbps at distances up to 7500 feet, for example. This provides an advantage over VDSL, which can deliver 20 Mbps only up to 4,000 feet. At these distances, the present invention covers at least three and a half times the area that VDSL can, thereby significantly increasing the addressable market for advanced services.

Conventional copper access technologies cannot support extended distances of 21,000 feet. However, the present invention not only surpasses 21,000 feet, it delivers speeds up to 2.9 Mbps at this distance. More than 99 percent of the loops in the United States are 21,000 feet or less in length. Through the present invention, broadband services are no longer limited to customers within a short distance of phone company facilities.

The present invention delivers fiber-class applications over existing copper infrastructure. In addition, this technology offers speeds of up to 100 Mbps which enable service providers to deploy over copper applications that were previously restricted to fiber. Immediate applications for extending 100 Mbps LANs or replacing T1/T3 Internet backhaul connections are available with the present invention. In addition, there are many new applications that enable service providers to exploit new opportunities.

Service providers are increasingly turning to IP networks to deliver television services to their customers. Most of these solutions rely on a high-speed copper connection, fed by fiber. When using conventional xDSL technologies for the copper connection, the service provider must limit the loop to 4,000 feet or less. This results in a very decentralized network, with many costly fiber-fed remote stations distributed throughout the service area. Because the present invention supports broadband speeds at much greater distances, it can significantly decrease the number of remote stations. For example, the present invention at 10 Mbps can service 7.5 times the area of VDSL. This provides a significantly larger addressable market. By providing broadband services to a larger addressable market, the system of the present invention provides increased revenue opportunities for service providers and other users.

The present invention is a significant step forward for broadband access technology. By delivering fiber-class applications over the existing copper infrastructure, the present invention serves as a copper bridge to the Optical Ethernet. Not only does it provide breakthrough maximum bandwidth of at least 100 Mbps, it delivers superior bandwidth at all supported distances, out to 21,000 feet or more. Service providers (and/or other users) may use the present invention to instantly expand their market (e.g., tenfold) by providing fiber class applications over copper where no fiber infrastructure currently exists.

Figure 12:
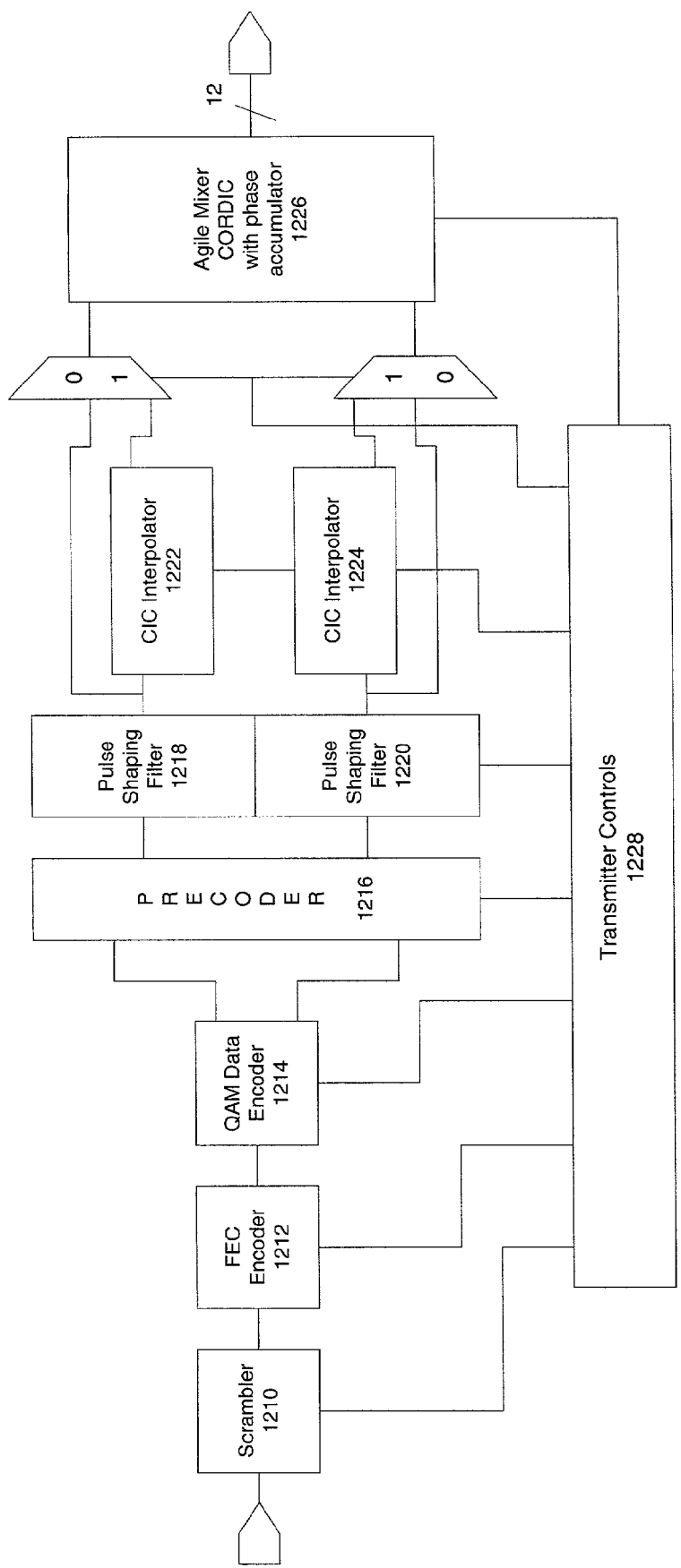
FIG. 12 is a diagram of an architecture of a transmitter, according to an embodiment of the present invention.

FIG. 12 is a diagram of an architecture of a transmitter, according to an embodiment of the present invention. The transmitter of the present invention is responsible for encoding a digital data stream into a waveform based encoding and sending that information via a copper plant to a receiver. The transmitter may transmit via two-wire lines, such as a telephone subscriber line. The transmitter may be designed to allow transmission of data rates of 100 Mbps, for example. This may be achieved by allowing encoding schemes of up to 8 bits of data encoded per symbol transmitted at rates of up to 13.333 Msymbols/second. Other variations may be made to the transmitter for delivering at different data rates.

As shown in FIG. 12, the transmitter of the present invention may include various blocks in the data path, which may include a Scrambler 1210; a FEC Encoder 1212; a QAM Data Encoder 1214; a Thomlinson Pre-Coder 1216; Pulse-Shaping Filters 1218, 1220; CIC Interpolators 1222, 1224; and an Agile Mixer 1226, as well as transmitter controls 1228. Other components may also be incorporated. Each of the datapath blocks will be described and explained in detail below.

Figures 13, 14:
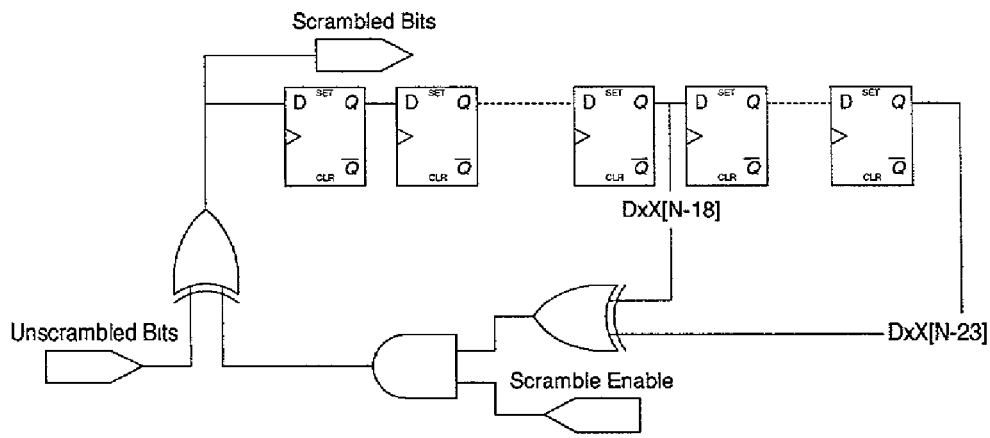
FIG. 13 is a block diagram of a scrambler, according to an embodiment of the present invention.
FIG. 14 is a logic table for differential phase encoding, according to an embodiment of the present invention.

FIG. 13 is a block diagram of a scrambler, according to an embodiment of the present invention. Scrambler 1210 provides the scrambling of the input bits, and further serves to whiten or flatten a spectrum of a signal being transmitted. Scramblers may be described by a tap polynomial. The tap polynomial, such as one used in VDSL applications, may be implemented in accordance with the present invention. The polynomial in this implementation may be represented by the following equation:

$$x(n)=m(n)+x(n-18)+x(n-23)$$

Typically, the scrambler may be on continuously throughout the transmission. The exceptions may include during certain phases of the training where another known type of spectrum may be desired.

A FEC encoder 1212 is responsible for adding coding gain by adding bits for error correction on a receiver.

A QAM data encoder 1214 may be implemented in the transmitter of the present invention. For transmitting digital data on a physical copper line plant, binary data may be encoded into an analog signal for subsequent decoding. The binary data may be encoded into symbols. According to an embodiment of the present invention, a plurality of symbol encoding schemes, which may include QPSK, QAM16, QAM64, and QAM256 may be implemented. These schemes may encode 2, 4, 6, and 8 bits into a single symbol, respectively. For example, in each modulation, a number of bits (e.g., two bits) may be used to perform a differential phase encode of the data based on a previous transmitted symbol. This differential phase encoding may be implemented to ensure that the transmitter does not need to know the initial phase of the data transmission in order to decode the bits. Other mechanisms in the receiver may function to ensure that the data is properly aligned with respect to the axes and that decoding takes place using a summation between received samples. The encoding may be performed using the following equations:

$$I_k = (\overline{D7_k \oplus D6_k}) \cdot (D6_k \oplus I_{k-1}) + (D7_k \oplus D6_k) \cdot (D6_k \oplus Q_{k-1})$$

$$Q_k = (\overline{D7_k \oplus D6_k}) \cdot (D7_k \oplus Q_{k-1}) + (D7_k D6_k) \cdot (D7_k \oplus I_{k-1})$$

For example, QPSK data may be created using two bits to create a symbol. Therefore, a single byte may contain four symbols to be transmitted. Each symbol may be used in turn to create the analog waveform to be decoded by the receiver. Those two bits may be used in each encoding scheme to create the phase shifts. The above equations result in a logic table for differential phase encoding as shown in FIG. 14.

Figure 15:
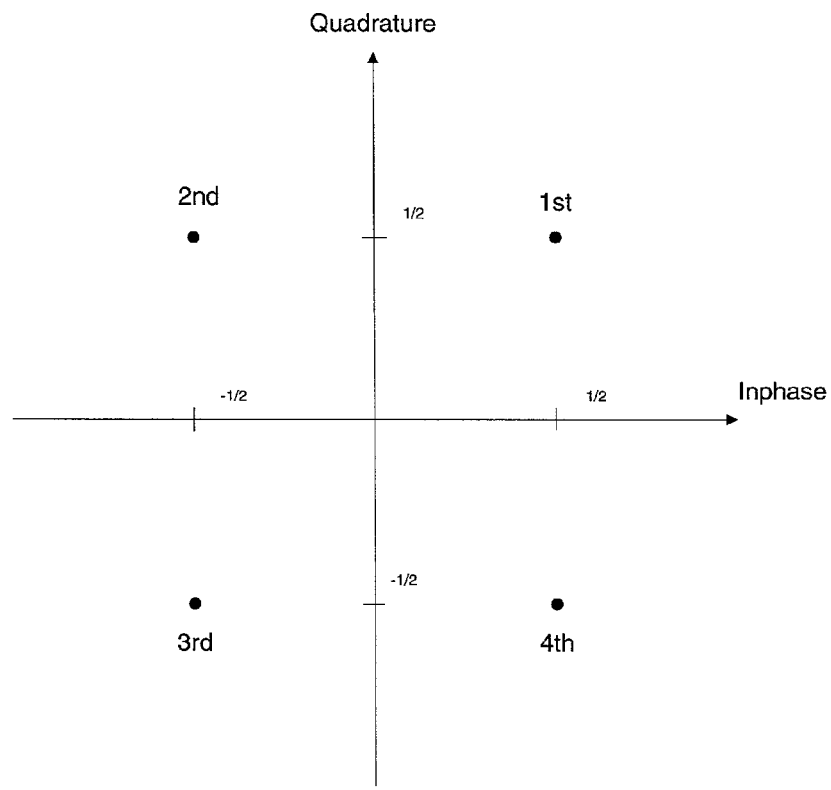
FIG. 15 illustrates a QPSK signal space mapping scheme, according to an embodiment of the present invention.
Figure 16:
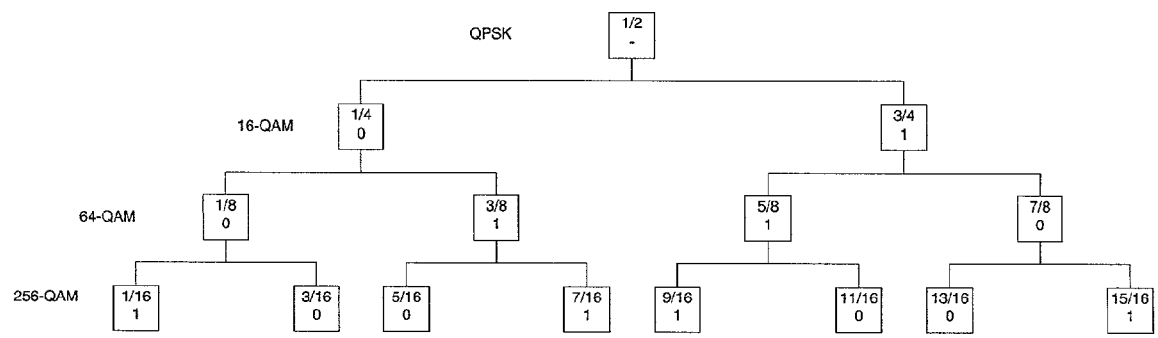
FIG. 16 illustrates a QAM encoding tree, according to an embodiment of the present invention.

FIG. 15 illustrates a QPSK signal space mapping scheme, according to an embodiment of the present invention. As for the remaining modulations (QAM16, QAM64, QAM256), the remaining bits for any particular QAM modulation may form symbol constellations. FIG. 16 illustrates a QAM encoding tree, according to an embodiment of the present invention. In QAM16, the two remaining bits may be split evenly for in-phase and quadrature-phase components with in-phase getting the first bit. In QAM64, in-phase may get the two most significant of the remaining four bits. In QAM256, in-phase may get the three most significant of the remaining six bits. The bits allocate certain amplitudes for encoding done in such a way that the neighbors may be separated by one bit for the encoding, for example. The quadrant encoding is responsible for rotating the constellation about the origin to achieve all points in the constellation as possibilities.

Figure 17:
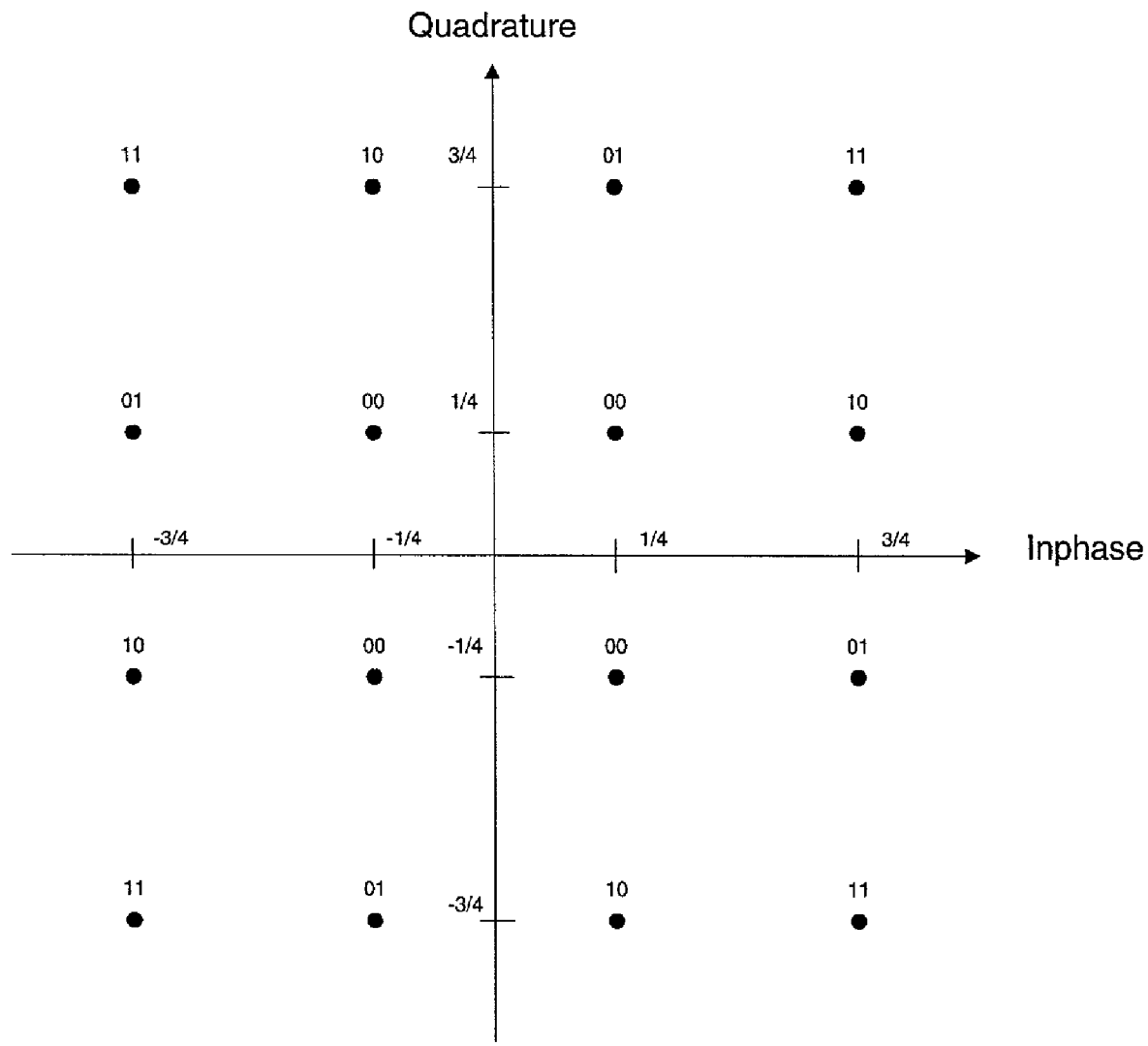
FIG. 17 illustrates a QAM16 constellation, according to an embodiment of the present invention.

FIG. 17 illustrates a QAM16 constellation, according to an embodiment of the present invention. In the constellation of FIG. 17, the bit encoding as derived from the encoding tree of FIG. 16 can be seen for QAM16. The rotation about the origin for each quadrant may be seen by the fact that the first quadrant may be rotated by some integer multiple of 90 degrees to achieve the remaining quadrants and allow decoding relative to previous symbols rather than absolute phase. This may be applicable to the remaining modulations. The tree of FIG. 16 may be used to create the constellation in the first quadrant. The quadrant constellation may then be rotated around the origin to achieve the full constellation. The encoding may be used to transmit the data across the channel to the receiver.

Figure 26:
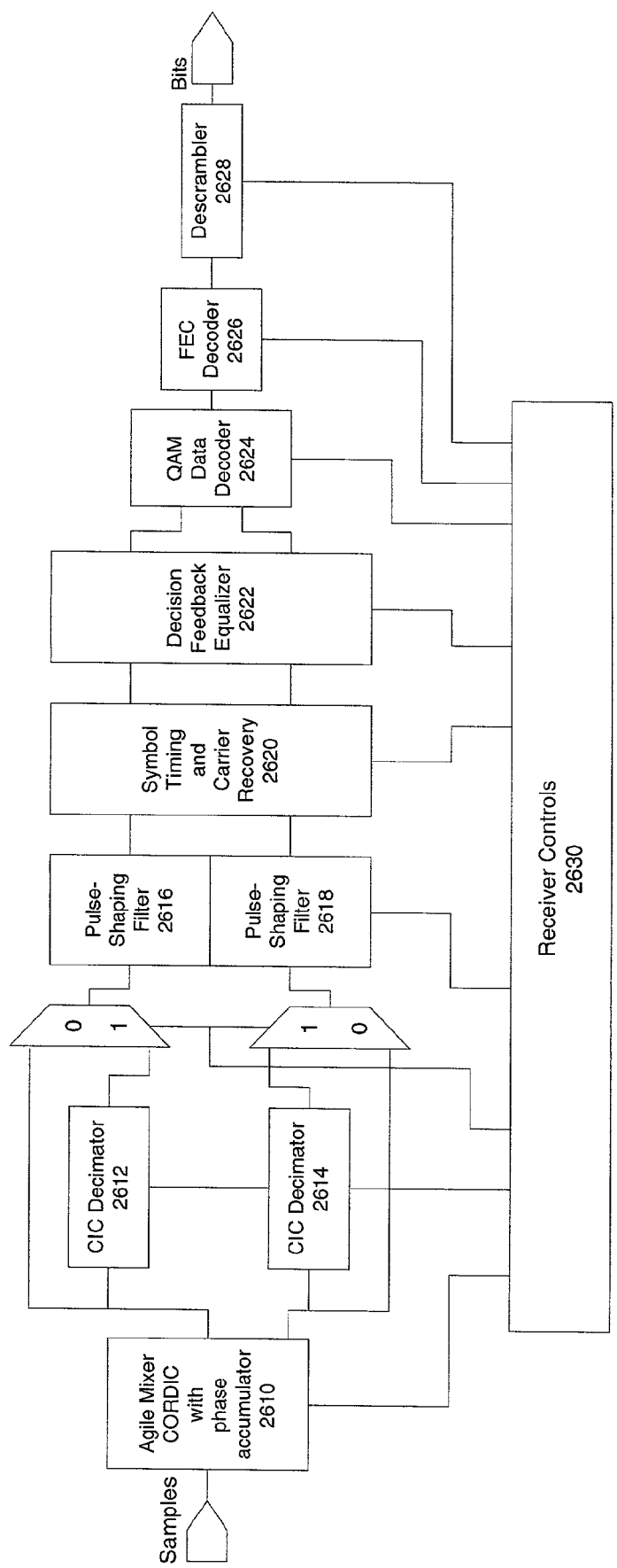
FIG. 26 is a diagram of an architecture of a receiver, according to an embodiment of the present invention.

A Thomlinson Pre-coder 1216 may be responsible for pre-emphasizing the transmitted signal to counteract the channel. Decision Feedback Equalizer (DFE) 2622, as shown in FIG. 26, may be trained at a receiver to equalize effects of intersymbol interference (ISI) and noise from the channel. The coefficients from DFE 2622 may then be transferred to pre-coder 1216 of the transmitter. The transmitted waveform may be pre-equalized with these coefficients, and modulo reduced in order to limit a peak to average ratio (PAR) of the transmitted waveform. At the receiver, the waveform is modulo reduced again, in order to restore the original waveform. The feedback components of the DFE are then no longer necessary at the receiver. One benefit of this arrangement is that equalization of current symbol does not depend on correct decisions being made on previous symbols. This arrangement reduces or eliminates error propagation in the receiver.

As for a pulse-shaping filter 1218, 1220, the system of the present invention may use one of two sampling frequencies to send data for a number (e.g., 1-18) of symbol rates. In order to transmit using either one of the two sampling rates, the signal may be interpolated to that speed. A pulse-shaping filter involving a low-pass finite impulse response (FIR) filter with a square-root raised cosine (SRRCOS) response may be used to interpolate the waveform to 4 samples per symbol for the two highest symbol rates or 8 samples per symbol for other rates. Other variations (e.g., different numbers per symbol) may be implemented. The SRRCOS algorithm may be used to reduce inter-symbol interference (ISI), which occurs when other symbols interfere with the desired symbol.

Figure 18:
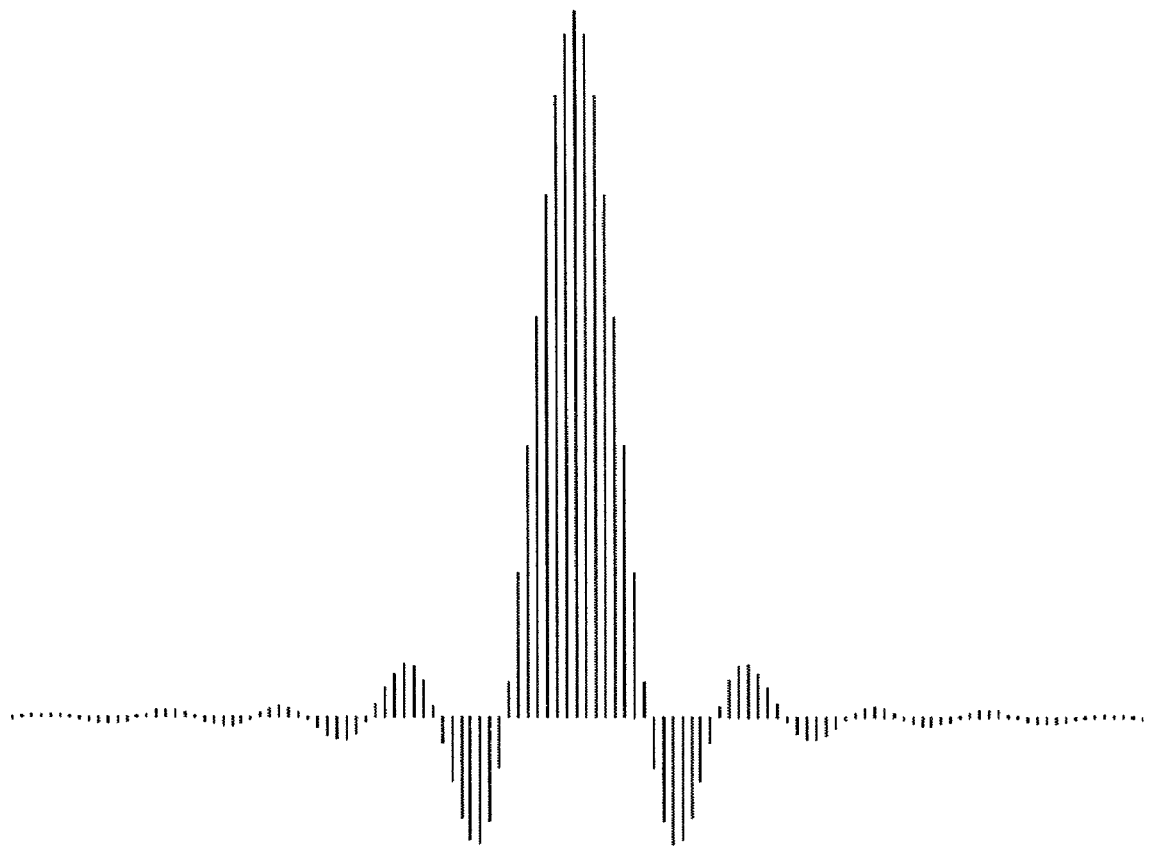
FIG. 18 illustrates an impulse response of a SRRCOS FIR filter, according to an embodiment of the present invention.

FIG. 18 illustrates an impulse response of a SRRCOS FIR filter, according to an embodiment of the present invention. This pulse-shaping filter reduces ISI and decreases the frequency content of the transmitted signal. For example, the filter may be 119 taps in length and may comprise approximately a full 15 symbols of time. Because this particular FIR filter may be used with an insertion of zeros between symbols, it may be implemented as a poly-phase filter with sub-filters (e.g., 8 sub-filters). Each sub-filter may start with an offset (e.g., between 0 and 7) into the filter taps and grab every $8^{th}$ coefficient. This allows for a savings of multipliers. For example, multipliers may be saved by not requiring each output to include 119 multiplies and 118 additions. A single output may require 15 multiplies and 14 additions where every $_8$th sample is non-zero. As a result, hardware resources may be saved. The same (or substantially similar) series of operations may be performed in order to get 4 samples per symbol, 8 samples per symbol, or other number of samples per symbol. For example, the output of 4 samples per symbol may pass every other sub-filter output instead of every sub-filter output.

A Cascaded Integrator-Comb (CIC) Interpolator 1222, 1224 is a hardware efficient method for interpolating low frequency signals (e.g., signals near DC in frequency) by small or large amounts. In the system of the present invention, the CIC may be responsible for interpolating base-band in-phase and quadrature-phase signals from a number of samples (e.g., 8 samples) per symbol to an analog front end transmit sample rate. For example, the Analog Device AD9876 front end may support data sample rates of 40 and 53.3 Mega-samples per second. Because of these speeds, the system of the present invention, in one example, may support an interpolation of up to 80 for the lowest symbol rate of 62.5 kilo-symbols per second. The CIC is a hardware efficient method for performing the interpolation without causing significant hardware growth as may occur if FIR filters were implemented.

Figure 19:
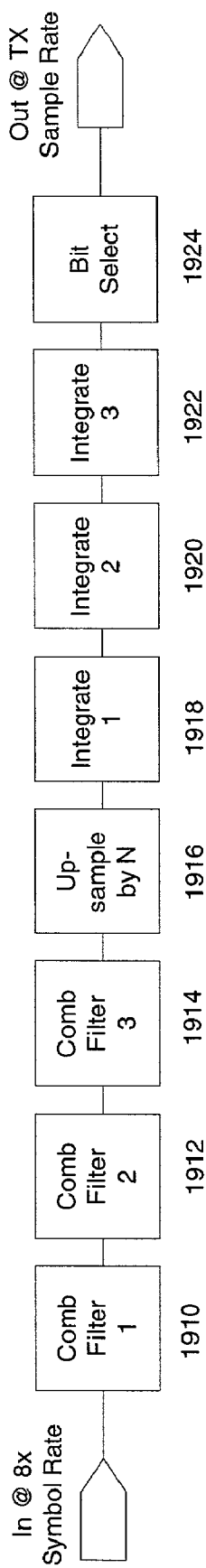
FIG. 19 is an example of a CIC interpolator structure, according to an embodiment of the present invention.

FIG. 19 is an example of a CIC interpolator structure, according to an embodiment of the present invention. The CIC interpolator may include at least three types of blocks, which may include a comb filter (e.g., 1910, 1912, 1914), an upsample logic (e.g., 1916), and an integrator (e.g., 1918, 1920, 1922). As shown in FIG. 19, a bit selector 1924 may be implemented.

Figure 20:
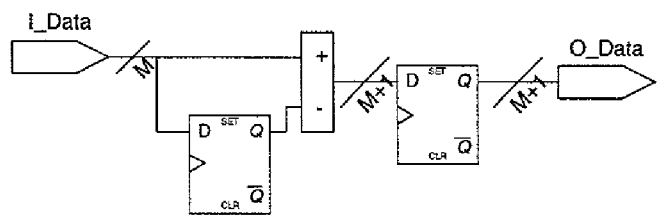
FIG. 20 is an example of a comb filter implementation, according to an embodiment of the present invention.

FIG. 20 is an example of a comb filter implementation, according to an embodiment of the present invention. A CIC comb filter is responsible for performing the mathematical equivalent of differentiation in discrete-time math. This section runs at a rate of 8 samples per symbol, or other rate. By restricting the input data to 8 samples per symbol, for example, the CIC has a reduced effect on any frequencies of interest from the base-band signal. The combs may grow the number of bits used in the CIC system in order to keep the data from becoming unbounded and meaningless. The math for the comb filter may be represented by the following equation:

$$y[n]=x[n]-x[n-1]$$

Figure 21:
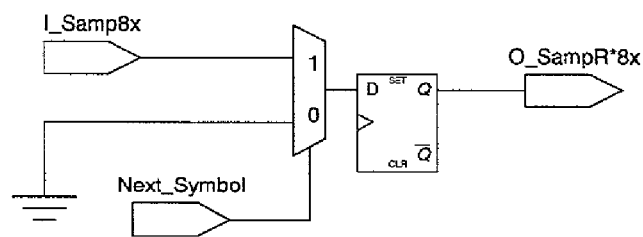
FIG. 21 is an example of an upsample logic, according to an embodiment of the present invention.

FIG. 21 is an example of an upsample logic, according to an embodiment of the present invention. An upsample logic (e.g. 1916) is responsible for inserting the correct number of zeros between each comb filter sample. The combs may be running at a rate of 8 samples per symbol, or other rate. The output register of the upsample logic may be running at the transmit sample rate. The upsample logic may pass the correct sample series into the integrator stages to obtain the original waveform.

Figure 22:
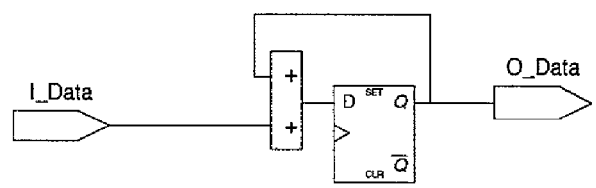
FIG. 22 is an example of an integrator stage, according to an embodiment of the present invention.

FIG. 22 is an example of an integrator stage, according to an embodiment of the present invention. The integrator stages are responsible for reconstruction of the waveform from a series of differentiations. According to an example, the integrators may be based on a feedback path. This enables the CIC integrators to grow in order to keep the data from becoming meaningless garbage. The integrators may be individually sized to allow for a bit growth to accommodate a worst case of interpolation. For example, the interpolation by a factor of 80 may be determined as the worst case and may be used to size the stages of the CIC Interpolator.

According to an example of the present invention, CIC interpolator functionality may be represented by the following equation:

$$y[n]=y[n-1]+x[n]$$

The efficiency of this design may be attributed, in part, to the use of addition stages (e.g., 3 stages) and subtraction stages (e.g., 3 stages) in order to accomplish the results. If the same interpolation were attempted using a single FIR filter, the filter would need to be programmable and up to several hundred taps in length with full multiplies for all taps, including the ones that would be zero.

Figure 23:
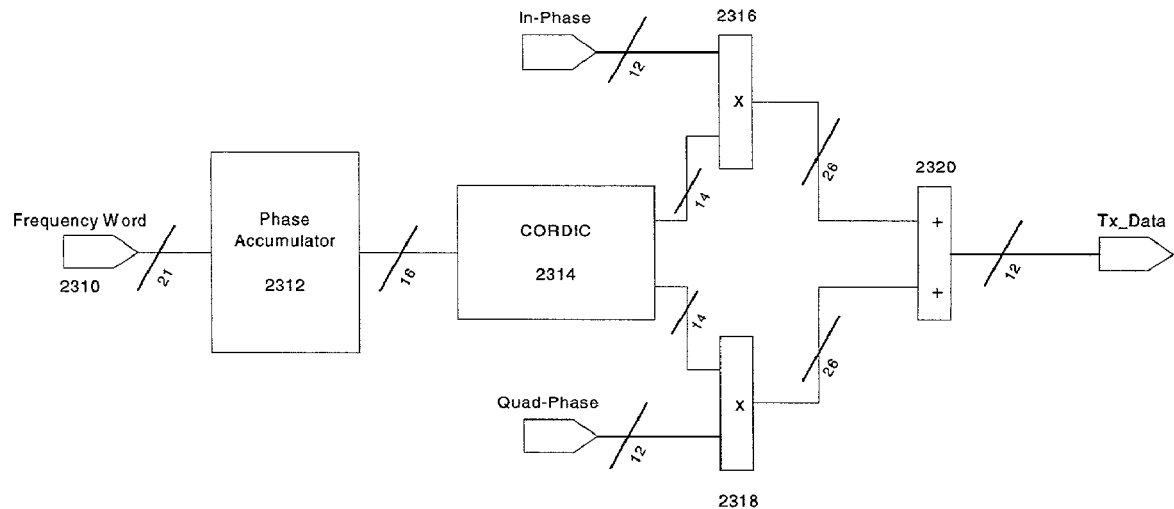
FIG. 23 illustrates a transmit mixer configuration, according to an embodiment of the present invention.

Flexibility in transmission is a key point in the ability to deploy the design of the present invention in multiple environments. The Agile Mixer (e.g., 1226) is responsible for taking the base-band in-phase and quadrature-phase signals and complex mixing the signals to transmit at a variable carrier frequency. FIG. 23 illustrates a transmit mixer configuration, according to an embodiment of the present invention. The mixer may include a frequency word 2310, a phase accumulator 2312, a Coordinate Rotation Digital Computer (CORDIC) 2314 to obtain the sine and cosine carriers, two multiplies 2316, 2318, and a summation 2320.

According to one example, the frequency word 2310 may be 21 bits in length and may be used by the phase accumulator 2312 to generate the phase to feed the CORDIC 2314. The phase accumulator 2312 may be 22 bits in length where a number of bits (e.g., upper 16 bits) may be fed to the CORDIC 2314. The CORDIC 2314 may iterate over a number of stages (e.g., 14 stages), which may include a pre-rotator to create a sine/cosine pair for the complex mix from base-band to transmit frequency. A first multiplier 2316 may combine an in-phase component and a CORDIC output, such as the sine output, and a second multiplier 2318 may combine a quad-phase component and the other CORDIC output, such as the cosine output. The outputs from the first multiplier 2316 and the second multiplier 2318, whose carrier signals have the same (or substantially similar) frequency with a 90 degree phase offset, may be combined to generate a complex transmit data component. This complex waveform generates a 2-dimensional constellation, with a quad-phase amplitude on one axis and an in-phase amplitude on an orthogonal axis. According to one example, frequency word calculation may be represented by the following equation:

$$Word = \frac{\frac{(1+alpha)}{2}SymbolRate + Offset}{TxSampRate} 2^{22}$$

Figure 24:
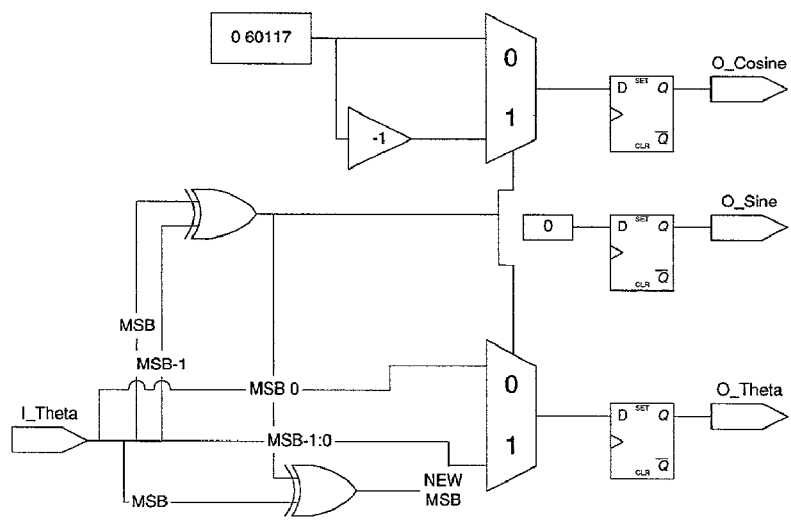
FIG. 24 illustrates a CORDIC pre-rotator implementation, according to an embodiment of the present invention.

FIG. 24 illustrates a CORDIC pre-rotator implementation, according to an embodiment of the present invention. The base logic of the CORDIC rotates through a range of roughly ±99 degrees. In order to allow the system of the present invention to use a full circle, a pre-rotator may be installed before the standard CORDIC rotation stages. A goal of the pre-rotator involves determining which half of the circle the CORDIC angle locates itself and then performs a rotation of the angle to place it in the right half of the circle while negating the initial amplitude of the cosine as necessary. The initial amplitude may be set so that passing through the CORDIC stages will allow it to grow to an amplitude of approximately 0.99, or other amplitude, thereby preventing the amplitudes from overflowing and polluting modulating carriers.

Figure 25:
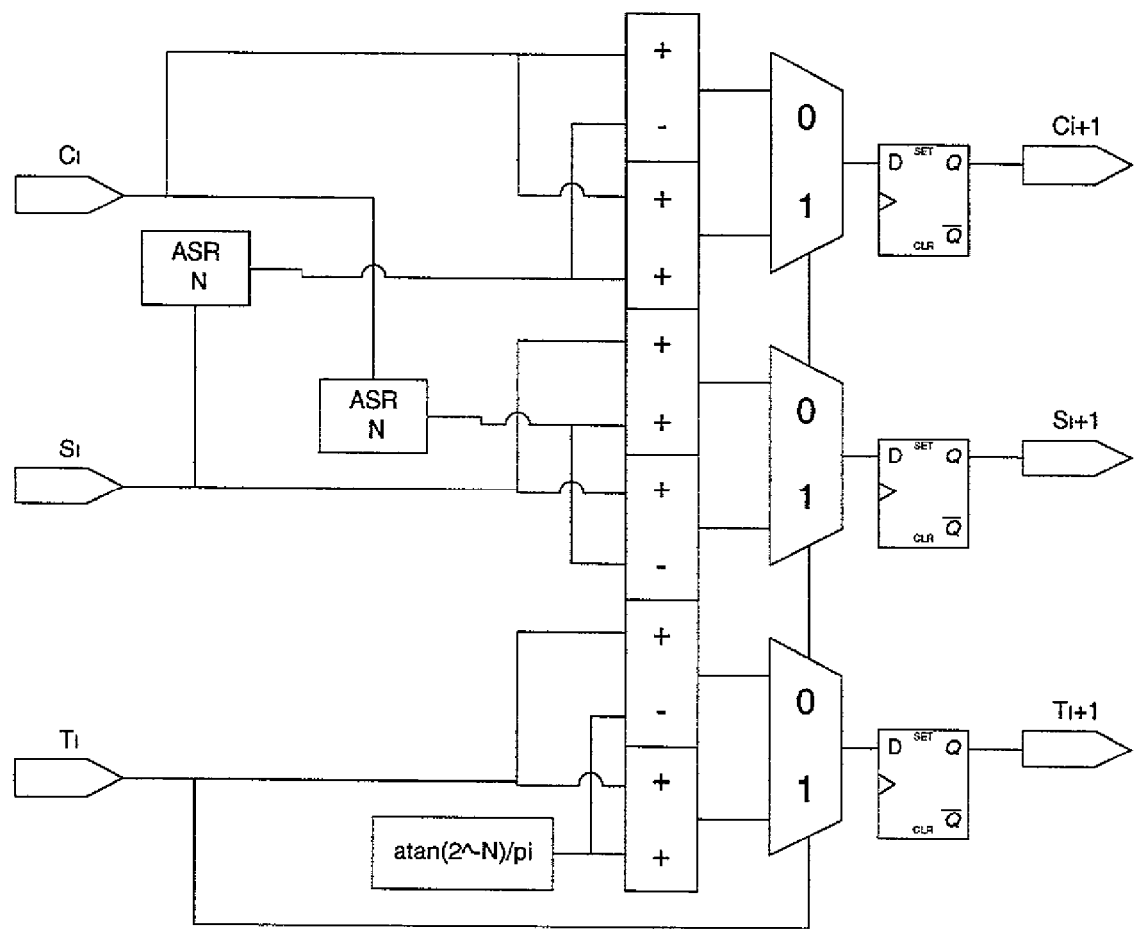
FIG. 25 illustrates an example of a CORDIC rotation stage, according to an embodiment of the present invention.

FIG. 25 illustrates an example of a CORDIC rotation stage, according to an embodiment of the present invention. The CORDIC rotation logic may be responsible for iteratively rotating an initial amplitude around a unit circle through successive stages in order to obtain a cosine/sine pair. The equations governing this motion may include the following:

$$C_{i+1} = C_i - S_i \cdot d_i \cdot 2^{-i}$$

$$S_{i+1} = S_i + C_i \cdot d_i \cdot 2^{-i}$$

$$T_{i+1} = T_i - d_i \cdot \tan^{-1}(2^i)$$

where, if $$T_i < 0, d_i = -1, \text{otherwise} + 1$$

where Ci represents a cosine input to a stage i, Si represents a sine input to stage i, Ti represents a theta (angle) input to stage i, and ASR N represents an Arithmetic Shift Right by N bits, with N=i for stage i. In short, an angle is responsible for creating the rotation by its relationship to the zero point. This iterative process allows the CORDIC to generate the sine and cosine of an angle of interest by moving in successively smaller increments about the unit circle. For example, if the angle is less than zero, the rotation is taken in a clockwise direction and if it is at least zero, it moves in a counter-clockwise direction. The equations above show that the stages may be implemented using a series of shifts and adds in order to generate the sine and cosine. Since the sine/cosine pair have no direct relationship to the angle, scaling may be used to eliminate gaps in the bit representation of angles around the circle. In addition, the equations allow for liberty to be taken in selecting the units used to specify the angle since it has no direct bearing on the sine and cosine components other than its sign. For example, the units used may be normalized between −1.0 and +1.0 (or other range) to allow bit possibilities to be valid locations around the unit circle.

A receiver of the system of the present invention is responsible for decoding a sampled analog signal into a series of symbols from the copper plant. The receiver of the present invention allows reception of data at rates of up to 100 Mbps, for example. This may be achieved by use of data encoding of 8 bits per symbol at symbol rates of up to 13.333 Msymbols/second, for example. As the transmitter is initiated before the receiver, design decisions may be made for the transmitter and receiver in parallel, as they are generally inverse operations of the other. FIG. 26 is a diagram of an architecture of a receiver, according to an embodiment of the present invention. The blocks in the data path may include an Agile Mixer 2610; CIC Decimators 2612, 2614; Pulse-Shaping Filters 2616, 2618; a Symbol Timing and Carrier Recovery 2620; a Decision Feedback Equalizer 2622; a QAM Data Decoder 2624; a FEC Decoder 2626; and a Descrambler 2628 as well as Receiver Controls 2630. Each of the major datapath blocks will be described and explained in detail below.

Figure 27:
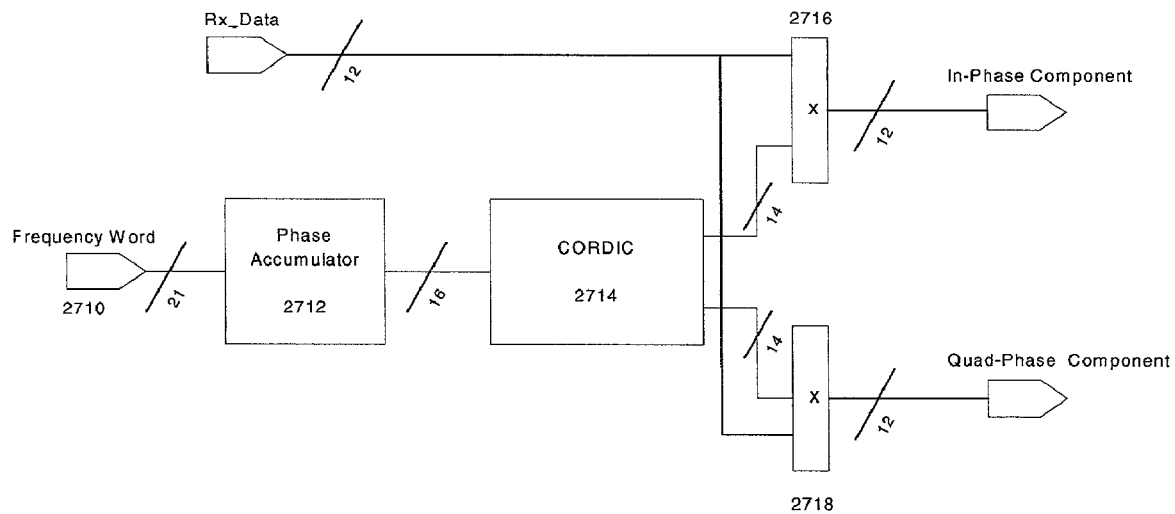
FIG. 27 illustrates an example of a receiver mixer configuration, according to an embodiment of the present invention.

FIG. 27 illustrates an example of a receiver mixer configuration, according to an embodiment of the present invention. The Agile Base-band Mixer 2610 is responsible for taking a pass-band signal and complex mixing the signal to in-phase and quadrature-phase base-band using a variable carrier frequency. The mixer may include a frequency word 2710, a phase accumulator 2712, a Coordinate Rotation Digital Computer (CORDIC) 2714 to obtain the sine and cosine carriers, and two multiplies 2716, 2718.

For example, the frequency word may be 21 bits in length and may be used by the phase accumulator 2712 to generate the phase to feed the CORDIC 2714. The phase accumulator 2712 may be 22 bits in length, for example, where a number of bits (e.g., the upper 16 bits) are fed to the CORDIC 2714. The CORDIC 2714 may iterate over a number of stages (e.g., 14 stages), including a pre-rotator to create a sine/cosine pair for the complex mix from base-band to transmit frequency. A first multiplier 2716 may generate an in-phase component and a second multiplier 2718 may generate a quad-phase component. Frequency word calculation may be represented by the following equation:

$$Word = \frac{\frac{(1+alpha)}{2} SymbolRate + Offset}{TxSampRate} 2^{22}$$

Figure 28:
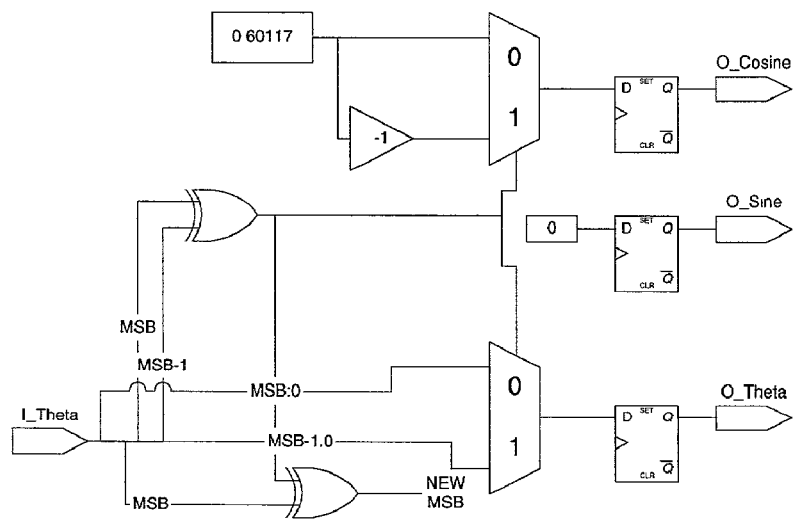
FIG. 28 is a diagram of a CORDIC pre-rotator implementation, according to an embodiment of the present invention.

FIG. 28 is a diagram of a CORDIC Pre-Rotator implementation, according to an embodiment of the present invention. The base logic of a CORDIC rotates through a range of roughly ±99 degrees. In order to allow the system to use a full circle, a pre-rotator may be installed before the standard CORDIC rotation stages. A goal of the pre-rotator is to determine which half of the circle the CORDIC angle locates itself and then performs a rotation of the angle to place it in the right half of the circle while negating the initial amplitude of the cosine as necessary. The initial amplitude is set so that passing through the CORDIC stages will allow it to grow to an amplitude of roughly 0.99, or other amplitude, thereby preventing the amplitudes from overflowing and polluting modulating carriers.

Figure 29:
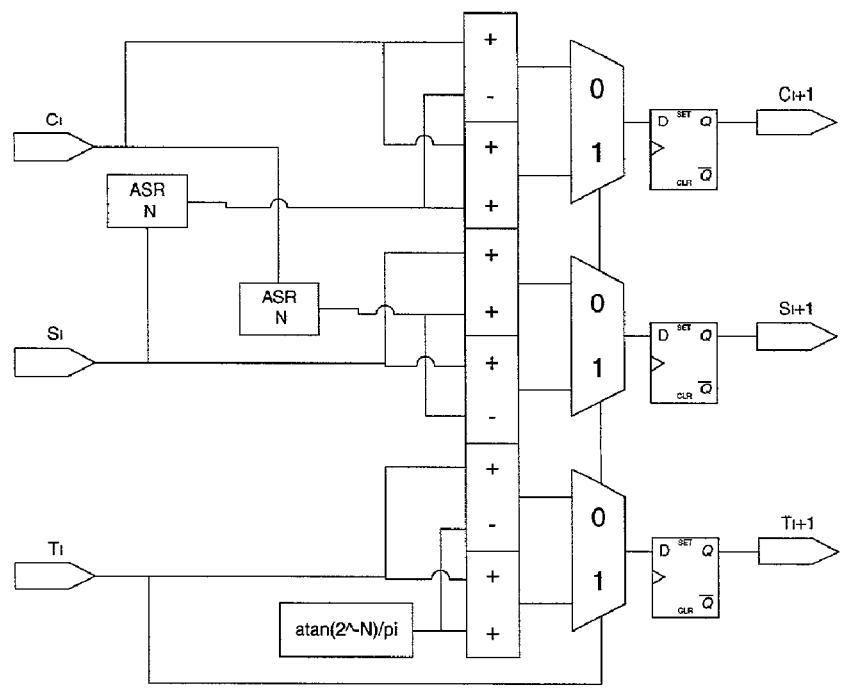
FIG. 29 is a diagram of a CORDIC rotation logic, according to an embodiment of the present invention.

FIG. 29 is a diagram of a CORDIC rotation logic, according to an embodiment of the present invention. The CORDIC rotation logic is responsible for iteratively rotating an initial amplitude around a unit circle through successive stages to obtain a cosine/sine pair. The equations governing this rotation may include the following:

$$C_{i+1}=C_i-S_i d_i 2^{-i}$$

$$S_{i+1}=S_i+C_i d_i 2^{-i}$$

$$T_{i+1}=T_i-d_i \tan^{-1}(2^{-i})$$

where, if $$T_i<0, d_i=-1, \text{otherwise}+1$$

In short, an angle is responsible for creating the rotation by its relationship to the zero point. This iterative process allows the CORDIC to generate the sine and cosine of the angle of interest by moving in successively smaller increments about the unit circle. The equations above show that the stages may use a series of shifts and adds or subtracts in order generate the sine and cosine. Since the sine/cosine pair have no direct relationship to the angle, scaling may be used to eliminate gaps in the bit representation of angles around the circle. For example, the units used may be normalized between −1.0 and +1.0, or other range.

Figure 30:
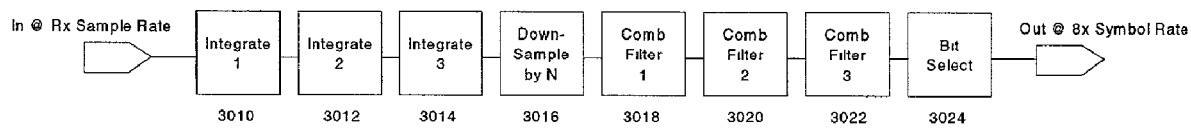
FIG. 30 is a diagram of a CIC decimator structure, according to an embodiment of the present invention.

FIG. 30 is a diagram of a CIC decimator structure, according to an embodiment of the present invention. The Cascaded Integrator-Comb (CIC) Decimator is a hardware efficient method for decimating signals near DC in frequency by small or large amounts. In the system of the present invention, the CIC may be responsible for decimating the base-band in-phase and quadrature-phase signals to 8 samples per symbol, for example, from the analog front end receive sample rate. For example, the Analog Device AD9876 front end may support data sample rates of 40 and 53.3 Mega-samples per second. Because of these speeds, the system of the present invention, in one example, may support a decimation of up to 80 for the lowest symbol rate of 62.5 kilo-symbols per second. The CIC is a hardware efficient method for performing this decimation without causing significant growth to the hardware, through the use of FIR filters.

The CIC decimator may include at least three types of blocks, such as the integrator (e.g., 3010, 3012, 3014), the downsample logic (e.g., 3016), and the comb filter (e.g., 3018, 3020, 3022), as shown in FIG. 30. A bit selector 3024 may also be implemented.

Figure 31:
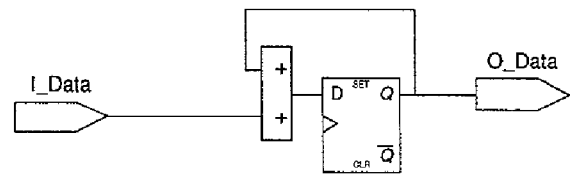
FIG. 31 is a diagram of a CIC integrator, according to an embodiment of the present invention.

FIG. 31 is a diagram of a CIC integrator, according to an embodiment of the present invention. The integrator stages perform the mathematical equivalent of integration on incoming data. Because the integrators are based on a feedback path, the CIC integrators may grow in order to keep the data from becoming meaningless garbage. However, using the CIC as a decimator means that some or most registers may grow by a fixed amount in the decimator based on a worst-case decimation. The decimation by a factor of 80, for example, may be considered a worst case in a system of the present invention and may be used to size the stages of the CIC decimator. The equation below represents integrator math.

$$y[n]=y[n-1]+x[n]$$

Figure 32:
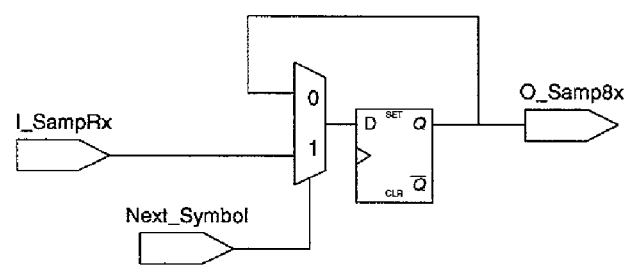
FIG. 32 is a diagram of a downsample logic, according to an embodiment of the present invention.

FIG. 32 is a diagram of a downsample logic, according to an embodiment of the present invention. The downsample logic is responsible for passing the sampled data at a rate of 8 samples per symbol to the comb filter sample. The combs may run at a rate of 8 samples per symbol. Other rates may be implemented. The output register of the downsample logic may run at the transmit sample rate. The downsample logic may pass the correct sample series into the integrator stages to obtain the original waveform.

Figure 33:
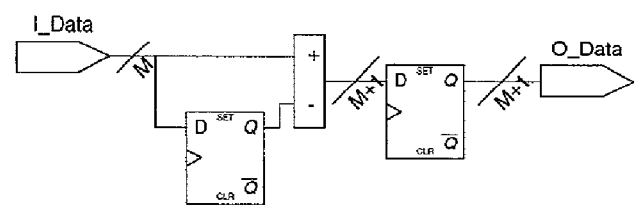
FIG. 33 is a diagram of a CIC comb filter, according to an embodiment of the present invention.

FIG. 33 is a diagram of a CIC comb filter, according to an embodiment of the present invention. The CIC comb is responsible for performing the mathematical equivalent of differentiation in discrete-time math. This section may run at a rate of 8 samples per symbol, for example. By restricting the input data to a number of samples (e.g., 8 samples per symbol), the CIC has a reduced effect on any frequencies of interest from the base-band signal. The combs may grow the number of bits used in the CIC system in order to keep the data from becoming unbounded and meaningless. The math for the comb filter may be represented as follows:

$$y[n]=x[n]-x[n-1]$$

One factor that makes this design so efficient is the use of a minimal number of basic stages (e.g., three addition and three subtraction stages) in order to accomplish what is effectively a large low-pass filter. If the same decimation were attempted using a single FIR filter, the filter would need to be programmable and up to several hundred taps in length with full multiplies for all taps. If this were attempted using an IIR filter, the IIR would need to be broken down into several second-order section (SOS) filters to achieve the results. While the filter may be smaller, it generally does not have a linear phase, which may result in corrupting the signal.

Figure 34:
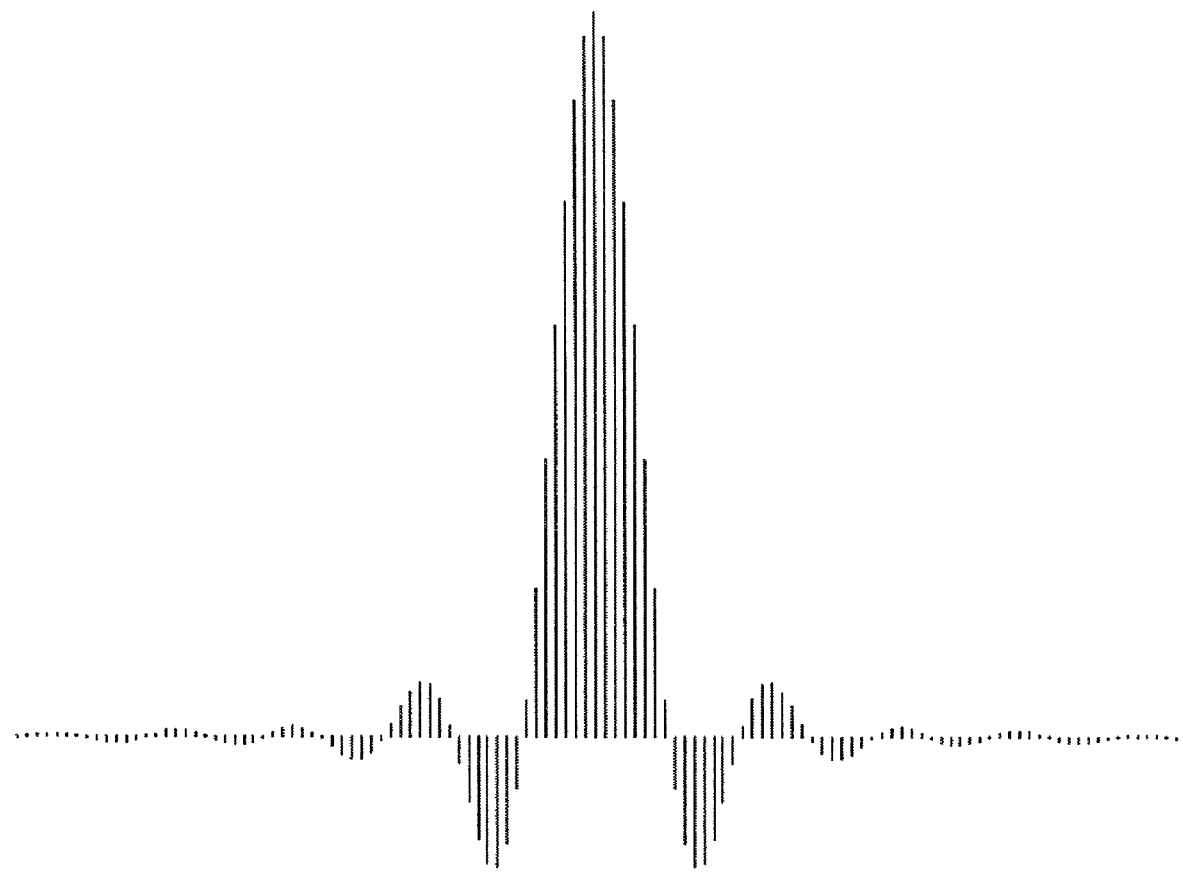
FIG. 34 is an example of an impulse response of a SRRCOS FIR filter, according to an embodiment of the present invention.

FIG. 34 is an example of an impulse response of a SRRCOS FIR filter, according to an embodiment of the present invention. The transmit and receive sections of the system of the present invention may contain a SRRCOS pulse shaping filter. This filter may be used in receiving to reduce the effects of out of band images on the signal of interest. The SRRCOS algorithm may be used to reduce inter-symbol interference (ISI), which may occur when other symbols may interfere with the desired symbol.

This pulse-shaping filter reduces ISI and decreases the frequency content of the transmitted signal. The filter may be symmetric with 119 taps in length and comprises almost a full 15 symbols of time. The filter is responsible for reducing the effect of out of band noise as well as reducing the ISI effects. According to an example of the present invention, for all but the top two symbol rates, the incoming data may be received at 8 samples per symbol. The top two symbol rates may be sampled at 4 samples per symbol where the AFE may sample at 40 and 53.3 Msamp/sec. Thus, the outgoing data may be transmitted at 8 samples per symbol.

Symbol Timing and Carrier Recovery 2620 may be used to synchronize the receiver to a transmitter symbol clock, so that decisions are made at an optimal sample time relative to the symbol waveform. Carrier recovery may be used to synchronize the receiver to a frequency and phase of a carrier wave of the transmitter so that demodulation results in an optimal received constellation.

Decision Feedback Equalizer 2622 may be trained at the receiver to equalize out effects of intersymbol interference (ISI) and noise from the channel. Past decisions are used in the feedback portion of the equalizer in order to reduce ISI.

QAM Data Decoder 2624 may involve an amplitude slicer and a differential phase detector to convert the equalized waveform back into a digital data stream.

Forward Error Correction (FEC) Decoder 2626 may use redundancy bits that were added by a FEC encoder, such as 1212 in FIG. 12, to correct any bit errors that are within correction capability of a FEC used. A plurality of FEC code may be used including, but not limited to Reed-Solomon Block Codes, Trellis-Coded Modulation, Turbo Codes, and Convolutional Codes. A variable depth interleaver may also be employed in conjunction with FEC codes in order to improve immunity to consecutive bit errors.

Figure 35:
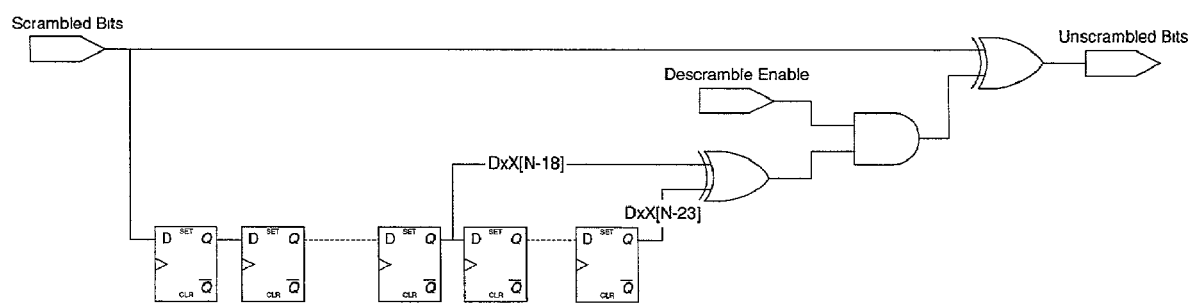
FIG. 35 is a block diagram of a descrambler, according to an embodiment of the present invention.

FIG. 35 is a block diagram of a descrambler, according to an embodiment of the present invention. Scrambling of the input bits serves to whiten or flatten the spectrum of the signal being transmitted. When the transmitting end uses a scrambler, a descrambler may be employed to undo the effect of scrambling and recover the original data from the received data. Descramblers may be described by a tap polynomial. The tap polynomial used in this implementation may use one used in VDSL applications, for example. The polynomial in this implementation may be represented by:

$$x(n)=m(n)+m(n-18)+m(n-23)$$

The descrambler may be activated by a control logic. The control logic may detect the presence of a transmission and wait for a certain span of time to pass. The logic may then activate the descrambler in order to undo the effects of scrambling on the data.

Another aspect of the present invention is directed to multiplexing a first modem for communicating information packets between the first modem and a plurality of second modems via single two-wire (e.g. telephone subscriber) lines.

Another aspect of the present invention is directed to buffering information packets received from a network via an interface into at least one buffer per secondary modem. This aspect of the present invention further involves monitoring the fill of these buffers and varying the ratio of packets communicated from each buffer as a function of the monitored fills.

Another aspect of the present invention is directed to enabling control information to be communicated from the first modem to each secondary modem to inform the secondary modems of when to transmit, in order to avoid collisions with other secondary modems. This control information, and information packets may be communicated individually to each secondary modem via an addressing scheme, or broadcast to a plurality or all secondary modems simultaneously, with each secondary modem responding only to packets addressed to themselves.

The present invention provides a Multi-Access (MA) protocol that enables a single link to be utilized by more than one access device (e.g., a CPE Modem). The Multi-Access protocol of the present invention provides a means to connect to multiple endpoints on a single local loop.

The MA protocol of the present invention leverages a burst mode operation to enable new services, such as multiple IP Streaming devices, to attach directly to a single loop. Each CPE Modem may communicate directly with a modem at a CO location thereby removing the need for expensive gateway devices and secondary in-building cabling to support multiple access points.

Current technology operates as a point-to-point transport with a single Central Office (CO) modem talking to a single CPE Modem. The modems receive packets on an Ethernet interface and transmit them (as required) as a burst of High-Level Data Link Control (HDLC) encapsulated frames. These bursts are received by the receiving modem and are processed to release the Ethernet frames onto an attached network. These modems implement a polled half duplex protocol to co-ordinate transmission and reception of bursts from each end. The protocol is initiated and controlled by the modem at the CO end.

The protocol generally starts with a CO modem assembling packets that are scheduled for transmission to the CPE modem into a burst and then transmitting the burst on an Ethernet interface. The CPE modem will detect the energy on the Ethernet interface and will turn on a receiving circuit to synchronize on a preamble and receive the burst. The CPE modem will process the burst to check the integrity of the received frames and release the packets to the Ethernet interface. After receiving a burst, the CPE modem will generate a reply burst to the CO Modem. The reply burst can contain Ethernet frames that are ready to be transmitted from the CPE Modem or may simply be an acknowledgement of the received burst. The CO modem will be ready to receive and process the reply burst from the CPE modem. This polling or ping-pong protocol will then be repeated for the next set of transmissions. If there is no data to send from either side, the CO and CPE modems will simply exchange polling messages. The CO modem is responsible for monitoring the process and recovering from error conditions.

Current systems generally include a CO controlling the protocol and a burst mode operation, where energy is released on a loop only when there is data to send.

Multi-Access (MA) protocol of the present invention enables multiple CPE devices to be connected via a single local loop to a CO modem. The MA protocol introduces CPE Selector (CSel) identifiers. The CO modem may observe a training process, which may include observing the training requests, on an Ethernet interface and assign unique CSel identifiers to each CPE modem as they complete the training process.

Each CPE modem may establish its own training parameters. The CO modem may maintain a table of available trained speeds per CPE modem to use in selecting speeds for bursts addressed to that CPE.

The CO modem may generate polling sequences that are addressed uniquely to each of the CPE modems. The CO modem may incorporate the CSel identifiers into a bridge table to create a logical mapping of the learned Ethernet Media Access Control (MAC) Addresses to the respective CPE modems. The CO modem may use logical CSel interfaces to forward outbound Ethernet packets in a burst to an appropriate CPE modem.

The CO modem may implement an adaptive polling sequence for optimizing servicing of actively communicating CPE modems using a technique similar to a multi-port operation of Etherloop™ as described in U.S. Pat. No. 5,912,895, involving a plurality of CPE modems communicating to a single CO modem, with each CPE modem attached to its own copper loop. CPE modems that are powered off or inactive may be polled less frequently to minimize the overhead in the polling sequence. The MA adaptive polling technique allows access to the link and may be tuned to meet specific latency objectives and/or other goals and purposes.

The CPE modems may learn their CSel identifier during the training sequence and may respond when bursts are directed to the CPEs identifier. The CPE modems may ignore bursts addressed to other units or bursts which are sent at a speed for which it is not currently trained. Each CPE modem may generate a reply burst to each polling sequence addressed to it.

According to another embodiment of the present invention, an Enhanced Multi-Access operating mode may be implemented for a special case scenario, which may involve a situation where a plurality or all CPE modems train and respond to a same set of speeds. For example, this may be the case when several CPEs are located fairly closely together (e.g., within a single house, office, or other location) connected via a single loop interface to the CO modem. In this case, the modems would see the same apparent distance to the CO modem. Thus, the modems may be able to train a common set of speeds. The CO modem may be responsible for managing and enforcing a subset of speeds that a plurality or all devices may operate on.

The Enhanced MA protocol of the present invention allows for a plurality or all CPE modems to receive and process a single burst on an interface. The modems will look at the frame headers on each packet to determine which frames are significant to them and process accordingly. Broadcast and Multi-Cast messages will be flagged so that designated or all modems may process the messages from a single packet in the burst.

The burst from the CO modem may include messages to sequence the reply messages from the individual CPE modems and other control parameters. The CPE modems may be responsible for observing reply messages and generating a reply burst in the specified sequence.

Enhanced MA protocol improves the throughput on an interface by: (1) reducing the number of bursts and line turn around operations; (2) enabling all modems be able to synchronize on a single preamble pattern; and (3) sending multicast and broadcast packets to designated or all modems with a single packet rather than sending a packet to each modem.

The CO modem may be responsible for establishing the Enhanced MA protocol operation. Based on various factors (e.g., such as provisioning parameters and current loop conditions), the CO modem may manage an enhanced mode and/or cause the devices to revert to MA protocol operating mode. According to an embodiment of the present invention, Enhanced MA protocol prefers that active CPE Modems operate at the same (or substantially similar) speed.

Figure 36:
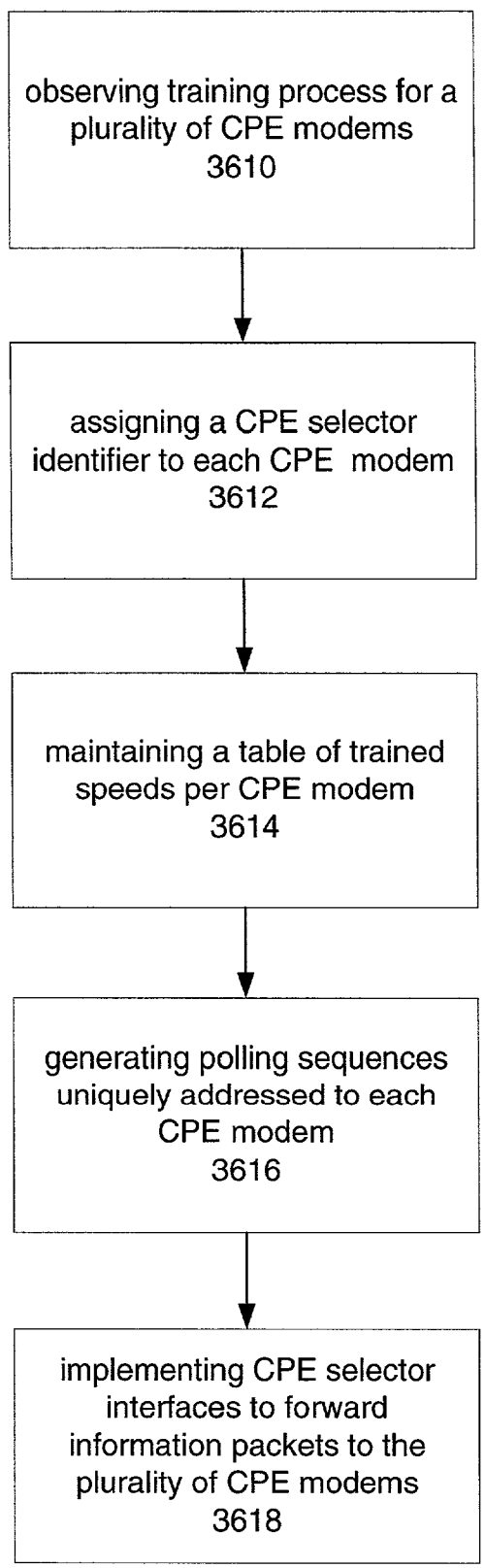
FIG. 36 is a flowchart illustrating steps associated with a CO modem side of a system for supporting MA protocol of the present invention.
Figure 37:
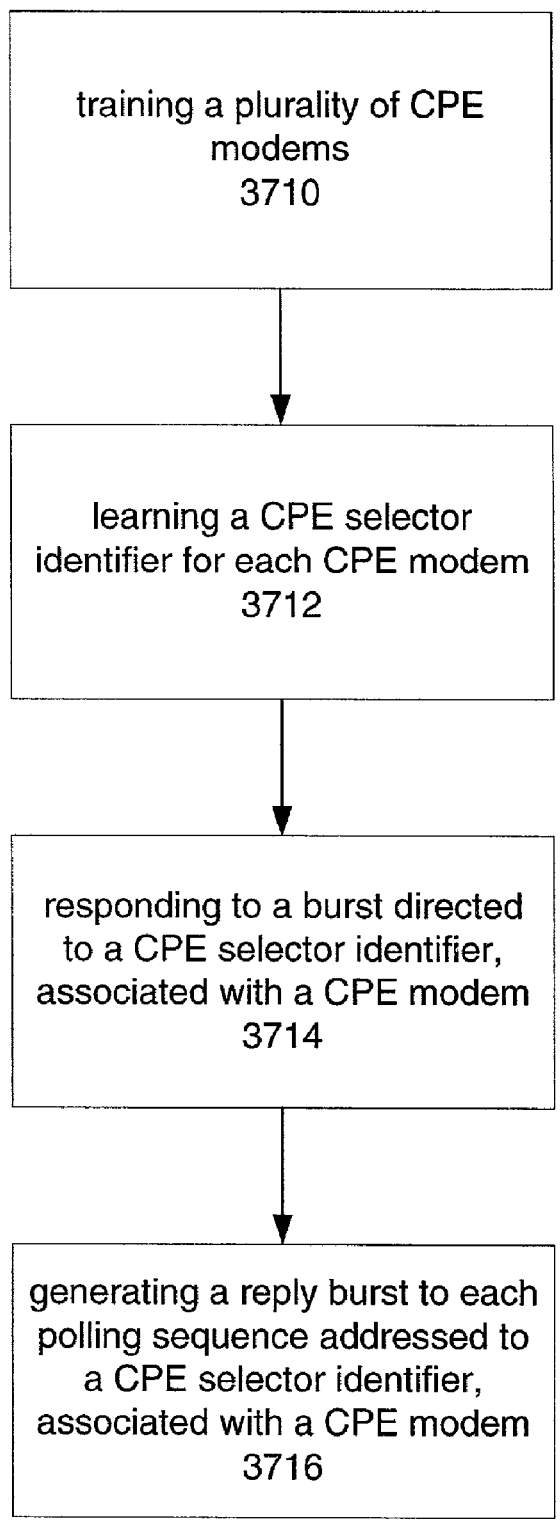
FIG. 37 is a flowchart illustrating steps associated with a CPE modem side of a system for supporting MA protocol of the present invention.

FIGS. 36 and 37 are flowcharts illustrating a Multi-Access protocol, according to an embodiment of the present invention. FIG. 36 illustrates steps associated with a CO modem side of a system for supporting MA protocol of the present invention. At step 3610, a CO modem may observe a training process for a plurality of CPE modems. At step 3612, a CPE selector identifier may be assigned to each CPE modem. At step 3614, a table of trained speeds per CPE modem may be maintained. In addition, other information or data specific to each CPE modem may be maintained as well. For example, CPE selector identifiers may be incorporated into a bridge table to create a logical mapping of MAC addresses to each CPE modem. At step 3616, polling sequences uniquely addressed to each CPE modem may be generated. For example, the polling sequences may include adaptive polling sequences to minimize polling directed to one or more inactive CPE modems for efficient use of resources. At step 3618, CPE selector interfaces may be implemented to forward information packets to the plurality of CPE modems.

FIG. 37 illustrates steps associated with a CPE modem side of a system for supporting MA protocol of the present invention. At step 3710, a plurality of CPE modems may be trained. At step 3712, a CPE selector identifier for each CPE modem may be learned by each CPE modem. At step 3714, each CPE modem may respond to a burst directed to a CPE selector identifier. For example, the CPE modem may observe a frame header on the information packet to determine processing data. At step 3716, a reply burst may be generated to each polling sequence. According to one example, the CPE modems may train and/or respond to a substantially similar speed. In another example, a broadcast message may be received wherein the CPE modem may process the broadcast message from a single packet in the burst. Control parameters may be received wherein the control parameters may include sequencing data associated with generating reply data.

Figure 38:
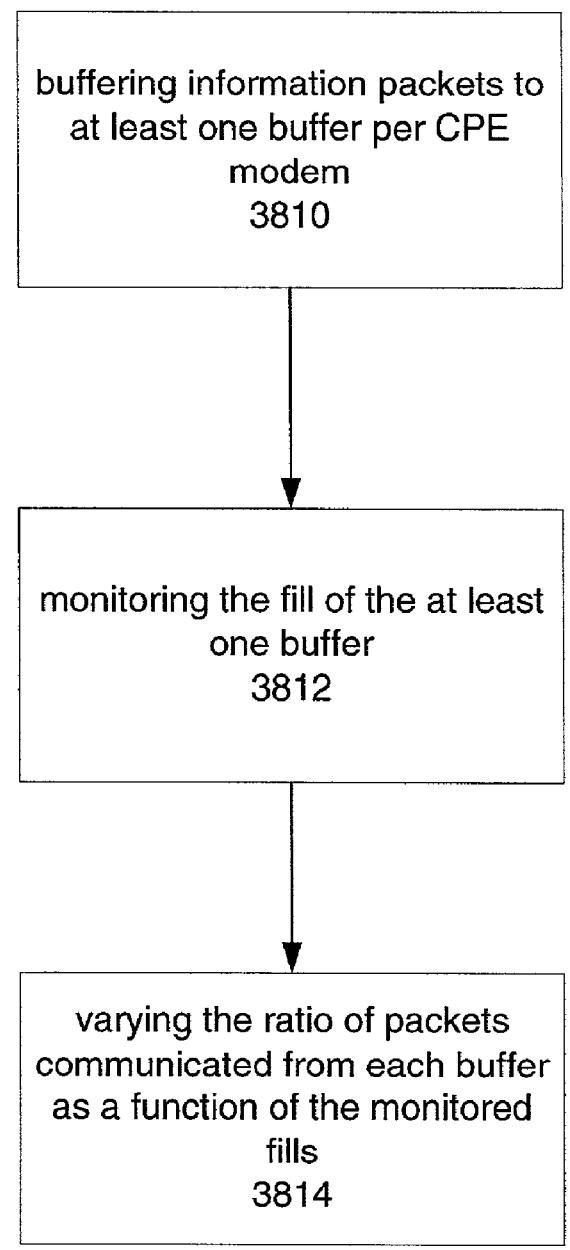
FIG. 38 illustrates additional steps associated with a Multi-Access protocol, according to an embodiment of the present invention.

FIG. 38 illustrates additional steps associated with a Multi-Access protocol, according to an embodiment of the present invention. At step 3810, information packets may be buffered to at least one buffer per CPE modem. At step 3812, the fill of the at least one buffer may be monitored. At step 3814, the ratio of packets communicated from each buffer may be varied as a function of the monitored fills of step 3812. In another example, control information may be communicated from a first CO modem to a plurality of CPE modems, wherein the control information comprises transmission data to avoid collisions with other CPE modems.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for communicating information packets between at least a first modem and a second modem via a communication line, the method comprising the steps of:

setting a fixed lower corner frequency to enable communications to occur on a portion of a communication spectrum not used by another coexisting application to enable line sharing functionality;

determining a center frequency based on the fixed lower corner frequency and a baud rate; wherein the center frequency is determined by $f_c$=(baud rate +excess bandwidth)/2 +fixed lower corner frequency; and operating a signal in a lower end of the communication spectrum wherein signal loss and crosstalk are reduced.

2. The method of claim 1, wherein the coexisting application includes at least one of analog voice band; integrated services digital network, Centrex, and digital private branch exchange.

3. The method of claim 1, further comprising the steps of:
detecting a symbol rate change; and
adjusting a frequency band for communication in response to the symbol rate change.

4. The method of claim 1, wherein the baud rate ranges from approximately 62.5 kHz to 13.333 Mhz.

5. The method of claim 1, further comprising the step of:
implementing a QAM 256 modulation scheme for increasing data rate.

6. The method of claim 1, further comprising the step of:
implementing a decision feedback equalizer for improved filtering.

7. The method of claim 1, further comprising the step of:
providing forward error correction for recovering corrupted data.

8. The method of claim 1, further comprising the step of:
delivering approximately 100 Mbps at a distance up to 2750 feet.

9. The method of claim 1, further comprising the step of:
delivering approximately 20 Mbps at a distance up to 7500 feet.

10. The method of claim 1, further comprising the step of:
delivering approximately 2.9 Mbps at a distance up to 21,000 feet.

11. A system for communicating information packets between at least a first modem and a second modem via a communication line, the system comprising:
a fixed corner frequency means for setting a fixed lower corner frequency to enable communications to occur on a portion of a communication spectrum not used by another coexisting application to enable line sharing functionality;
a center frequency means for determining a center frequency based on the fixed lower corner frequency and a baud rate; wherein the center frequency is determined by $f_c$=(baud rate +excess bandwidth)/2 +fixed lower corner frequency; and
an operating means for operating a signal in a lower end of the communication spectrum wherein signal loss and crosstalk are reduced.

12. The system of claim 11, wherein the coexisting application includes at least one of analog voice band; integrated services digital network, Centrex, and digital private branch exchange.

13. The system of claim 11, further comprising:
a detecting means for detecting a symbol rate change; and
an adjusting means for adjusting a frequency band for communication in response to the symbol rate change.

14. The system of claim 11, wherein the baud rate ranges from approximately 62.5 kHz to 13.333 Mhz.

15. The system of claim 11, further comprising a QAM 256 modulation scheme for increasing data rate.

16. The system of claim 11, further comprising a decision feedback equalizer for improved filtering.

17. The system of claim 11, further comprising a forward error corrector for recovering corrupted data.

18. The system of claim 11, wherein the system delivers approximately 100 Mbps at a distance up to 2750 feet.

19. The system of claim 11, wherein the system delivers approximately 20 Mbps at a distance up to 7500 feet.

20. The system of claim 11, wherein the system delivers approximately 2.9 Mbps at a distance up to 21,000 feet.

21. A transmitter for communicating information packets via a communication line, the transmitter comprising:
an encoder for encoding a digital data stream into a waveform; and
a transmitting means for transmitting the waveform comprising information packets via a two-wire line, wherein the two-wire line is a telephone subscriber line,
the transmitting means comprising:
means for setting a fixed lower corner frequency to enable communications to occur on a portion of a communication spectrum not used by another coexisting application to enable line sharing functionality;
means for determining a center frequency $f_c$ as the fixed lower corner frequency plus half the sum of a baud rate and an excess bandwidth; and
means for operating a signal in a lower end of the communication spectrum wherein signal loss and crosstalk are reduced.

22. The transmitter of claim 21, wherein the coexisting application includes at least one of analog voice band; integrated services digital network, Centrex, and digital private branch exchange.

23. The transmitter of claim 21, further comprising a scrambler for scrambling a plurality of input bits to whiten the spectrum of the signal being transmitted.

24. The transmitter of claim 23, wherein a tap polynomial of the scrambler is represented by $$x(n)=m(n)+x(n-18)+x(n-23).$$

25. The transmitter of claim 21 further comprising a FEC encoder for adding coding gain by adding a plurality of bits for error correction.

26. The transmitter of claim 21, further comprising a QAM data encoder for performing a differential phase encoding.

27. The transmitter of claim 21, further comprising a Thomlinson pre-coder for pre-emphasizing the signal to counteract the communication line.

28. The transmitter of claim 21, further comprising at least one pulse-shaping filter comprising a low-pass finite impulse response filter with a square-root raised cosine response to interpolate a waveform to a predetermined number of samples per symbol.

29. The transmitter of claim 23, further comprising at least one cascaded integrator comb interpolator for interpolating a frequency signal by a predetermined amount.

30. The transmitter of claim 21, further comprising an agile mixer for receiving a base-band in-phase signal and quadrature-phase signal and complex mixing the signals to transmit at a variable carrier frequency.

31. A receiver for receiving information packets via a communication line, the receiver comprising:
a decoding means for decoding a sampled analog signal into a series of symbols; and
a receiving means for receiving the sampled analog signal via a two-wire line, wherein the two-wire line is a telephone subscriber line;

the receiving means comprising:
  means for setting a fixed lower corner frequency to enable communications to occur on a portion of a communication spectrum not used by another coexisting application to enable line sharing functionality;
  means for determining a center frequency $f_c$ as the fixed lower corner frequency plus half the sum of a baud rate and an excess bandwidth; and
  means for operating a signal in a lower end of the communication spectrum wherein signal loss and crosstalk are reduced.

32. The receiver of claim 31, wherein the coexisting application includes at least one of analog voice band; integrated services digital network, Centrex, and digital private branch exchange.

33. The receiver of claim 31, further comprising an agile mixer for receiving a pass-band signal and complex mixing the pass-band signal to an in-phase base-band and a quadrature-phase base-band using a variable carrier frequency.

34. The receiver of claim 31, further comprising at least one cascaded integrator comb decimator for decimating an input signal by a predetermined amount.

35. The receiver of claim 31, wherein the receiver comprises at least one pulse-shaping filter comprising a low-pass finite impulse response filter with a square-root raised cosine response to interpolate a waveform to a predetermined number of samples per symbol.

36. The receiver of claim 31, further comprising a descrambler for recovering original data, wherein a tap polynomial of the descrambler is represented by:

$$x(n)=m(n)+m(n-18)+m(n-23).$$

37. A method for communicating information packets between a first CO modem and a plurality of CPE modems, the method comprising the steps of:
  observing a training process for the plurality of CPE modems;
  assigning a CPE selector identifier to each CPE modem based on the training process;
  responding to a burst directed to a CPE selector identifier;
  buffering the information packets received from a network into at least one buffer per CPE modem;
  monitoring the step of buffering the information packets; and varying a ratio of packets communicated from each buffer associated with the plurality of CPE modems as a function of the step of monitoring.

38. The method of claim 37, wherein each CPE modem of the plurality of CPE modems communicates via a single loop.

39. The method of claim 37, wherein each CPE modem of the plurality of CPE modems communicates via individual connecting loops.

40. The method of claim 37, further comprising the steps of:
  communicating control information from the first CO modem to each plurality of CPE modems, wherein the control information comprises transmission data to avoid collisions with other CPE modems.

41. The method of claim 40, wherein the control information is communicated via an addressing scheme.

42. The method of claim 40, wherein the control information is communicated via a broadcast scheme to the plurality of CPE modems, wherein each CPE modem responds individually.

43. A method performed by a Central Office (CO) modem, the method comprising the steps of:
  observing a training process for a plurality of CPE modems;
  assigning a single different CPE selector identifier to each CPE modem based on the training process;
  generating a polling sequence addressed to each CPE modem; and
  forwarding a plurality of information packets in a burst to the plurality of CPE modems, wherein each of the plurality of information packets is addressed with the single different CPE selector identifier which identifies one of the plurality of CPE modems as an intended destination.

44. The method of claim 43, further comprising the step of:
  maintaining a table of trained speeds for the plurality of CPE modems for selecting a speed for forwarding the information packets addressed to one of the plurity of CPE modems.

45. The method of claim 43, wherein the CPE selector identifiers are incorporated into a bridge table to create a logical mapping of MAC addresses to each CPE modem.

46. The method of claim 43, further comprising the step of:
  implementing a plurality of CPE selector interfaces to forward the information packets in the burst to each CPE modem.

47. The method of claim 43, wherein the polling sequences are adaptive polling sequences for minimizing polling directed to one or more inactive CPE modems.

48. the system of claim 43, wherein the single different CPE selector indicator is unique.

49. A method for receiving information packets,the method performed by a CPE modem, the method comprising the steps of:
  training the CPE modem;
  during the training, learning a single different CPE selector identifier associated with the CPE modem;
  receiving in a burst a plurality of packets addressed to the learned single different CPE selector identifier;
  responding to the burst of the plurality of packets addressed to the learned single different CPE selector identifier, and
  generating a reply burst of a plurity of packets to each polling sequence addressed to the learned CPE selector identifier.

50. The method of claim 49, wherein the CPE modem is one of a plurality of CPE modems responding to a substantially similar set of speeds.

51. The method of claim 49, further comprising the steps of:
  receiving a message for enabling the CPE modem to process the burst of packets addressed to the learned single different CPE selector identifier;
  process the burst of packets addressed to the learned single different CPE selector identifier; and
  recovering from the processed burst of packets a broadcast message.

52. The method of claim 51, wherein the burst of packets comprises control parameters.

53. The method of claim 52, wherein the control parameters comprise sequencing data associated with generating data transmitted in the reply burst of packets.

54. The system of claim 49, wherein the single different CPE selector indicator is unique.

55. A system for communicating information packets between a first CO modem and a plurality of CPE modems, the system comprising:
  an observing means for observing a training process for the plurality of CPE modems;
  an assigning means for assigning a CPE selector identifier to each CPE modem based on the training process; and a responding means for responding to a burst directed to a CPE selector identifier;

a buffering means for buffering the information packets received from a network into at least one buffer per CPE modem;

a monitoring means for monitoring the buffering means; and a varying means for varying a ratio of packets communicated from each buffer associated with the plurality of CPE modems as a function of the monitoring means.

56. The system of claim 55, wherein each CPE modem of the plurality of CPE modems communicates via a single loop.

57. The system of claim 55, wherein each CPE modem of the plurality of CPE modems communicates via a respective one of a plurality of individual connecting loops.

58. The system of claim 55, further comprising:

a communicating means for communicating control information from the first CO modem to each of the plurality of CPE modems, wherein the control information comprises transmission data to avoid collisions with other CPE modems.

59. The system of claim 58, wherein the control information is communicated via an addressing scheme.

60. The system of claim 58, wherein the control information is communicated via a broadcast scheme to the plurality of CPE modems, wherein each CPE modem responds individually.

* * * * *

UNITED STATES PATENT AND TRADEMARK OFFICE
CERTIFICATE OF CORRECTION

PATENT NO. : 7,430,212 B2
APPLICATION NO. : 10/073098
DATED : September 30, 2008
INVENTOR(S) : Stanley et al.

It is certified that error appears in the above-identified patent and that said Letters Patent is hereby corrected as shown below:

Column 3, line 23, delete "," immediately following the word "line"
Column 4, line 22, delete "," immediately following the word "line"
Column 4, line 27, replace the word "comer" with the word --corner--
Column 4, line 65, replace ";" with --,-- immediately following the word "band"
Column 5, line 14, delete "," immediately following the word "modems"
Column 5, line 38, replace the word "communication" with the word --communicating--
Column 6, line 13, delete "," immediately following the word "modems"
Column 6, lines 55, replace the word "uses" with the word --use--
Column 6, line 56, replace the word "comer" with the word --corner--
Column 8, line 49, replace the word "comer" with the word --corner--
Column 9, line 10, replace the word "comer" with the word --corner--
Column 9, line 19, replace the word "comer" with the word --corner--
Column 12, line 49, insert --,-- immediately following the word "QAM256"
Column 14, line 12, replace "$_8$th" with --$8^{th}$--
Column 14, line 54, replace "$y[n]=x[n]-x[n-1]$" with --$y[n]=x[n]-x[n-1]$--
Column 15, line 30, replace "2316" with --2316--

Column 16, line 18, replace " $T_{i\text{-}1} = T_i - d_i \cdot \tan^{-i}(2^i)$ " with -- $T_{i+1} = T_i - d_i \cdot \tan^{-i}(2^{-i})$ --

Column 16, line 24, replace the word "Arithmentic" with the word --Arithmetic--
Column 17, line 55, insert the word --to-- immediately following the word "order"
Column 20, line 61, delete "," immediately following the word "requests"
Column 23, line 12, replace ";" with --,-- immediately following the word "band"
Column 23, line 43, replace the word "comer" with the word --corner--
Column 23, line 57, replace ":" with --,-- immediately following the word "band"
Column 24, line 31, replace ";" with --,-- immediately following the word "band"
Column 25, line 13, replace ":" with --,-- immediately following the word "band"
Column 26, line 13, replace the word "plurity" with --plurality--
Column 26, line 36, replace the word "plurity" with --plurality--
Column 26, line 39, replace the word "plurity" with --plurality--

Signed and Sealed this

Nineteenth Day of January, 2010

David J. Kappos
*Director of the United States Patent and Trademark Office*